(12) United States Patent
Ishikawa

(10) Patent No.: US 7,788,714 B2
(45) Date of Patent: Aug. 31, 2010

(54) PACKET TRANSFER APPARATUS

(75) Inventor: Yuichi Ishikawa, Machida (JP)

(73) Assignee: Alaxala Networks Corporation, Kanagawa (JP)

( * ) Notice: Subject to any disclaimer, the term of this patent is extended or adjusted under 35 U.S.C. 154(b) by 62 days.

(21) Appl. No.: 12/333,378

(22) Filed: Dec. 12, 2008

(65) Prior Publication Data

US 2009/0249469 A1 Oct. 1, 2009

(30) Foreign Application Priority Data

Mar. 26, 2008 (JP) ............................. 2008-079798

(51) Int. Cl.
*G06F 17/00* (2006.01)
(52) U.S. Cl. ........................................ 726/13; 370/389
(58) Field of Classification Search ................. 370/389, 370/401, 395
See application file for complete search history.

(56) References Cited

U.S. PATENT DOCUMENTS

| | | | | |
|---|---|---|---|---|
| 6,850,521 | B1* | 2/2005 | Kadambi et al. | 370/389 |
| 2006/0002386 | A1* | 1/2006 | Yik et al. | 370/389 |
| 2006/0165103 | A1* | 7/2006 | Trudeau et al. | 370/401 |
| 2006/0239273 | A1* | 10/2006 | Buckman et al. | 370/395.41 |
| 2007/0195762 | A1* | 8/2007 | Choi et al. | 370/389 |

OTHER PUBLICATIONS

Tomoyuki Oku et al, Power-Saving Method for Forwarding Database Lookup in Network Node, Institute of Electronics, Information, and Communication Engineers General Conference, (2005) (English Translation).
S Blake et al., An Architecture for Differentiated Services, Network Working Group, (1998) The Internet Society, pp. 1-36.
J. Heinanen et al., Assured Forwarding PHB Group, Network Working Group, The Internet Society (1999), pp. 1-11.
V. Jacobson et al. An Expedited Forwarding PHB, The Internet Society (1999) pp. 1-11.
J. Rajahalme et al., IPv6 Flow Label Specification, The Internet Society (2004) pp. 1-9.
Atsushi Ogasawara, Information Communications Energy Problem—Energy Conservation Required in Communications Infrastructure—Science and Technology Trends Research—Jun. 2006.

* cited by examiner

*Primary Examiner*—Thong H Vu
(74) *Attorney, Agent, or Firm*—Antonelli, Terry, Stout & Kraus, LLP.

(57) ABSTRACT

Plural retrieval units are prepared, and a retrieval unit which can reduce power consumption is selected according to the condition of a retrieval key. For example, in general, the retrieval unit including a CAM is used. However, when the condition of the retrieval key is simple as in a case where reference is made to only TOS in an interior node of Diffserv and QoS is determined, the retrieval unit including a dscp-QoS table constituted of an FF or RGF is used and the power consumption is reduced. A CAM retrieval start determination section determines that a process is performed by which retrieval unit in accordance with previously set setting information or a previously set header information item.

18 Claims, 20 Drawing Sheets

(i) CASE WHERE CAMS ARE OCCUPIED AND USED BY FLOW RETRIEVAL SECTION AND ROUTE RETRIEVAL SECTION RESPECTIVELY (ii) CASE WHERE ONE CAM IS COMMONLY USED BY FLOW RETRIEVAL SECTION AND ROUTE RETRIEVAL SECTION

FIG. 6

FLOW RETRIEVAL TABLE (CAM) — 400

| | INPUT LINE | SOURCE MAC ADDRESS | DESTINATION MAC ADDRESS | TRANSMISSION SOURCE IP ADDRESS | DESTINATION IP ADDRESS | TOS | TRANSMISSION SOURCE PORT NUMBER | DESTINATION PORT NUMBER |
|---|---|---|---|---|---|---|---|---|
| ADDRESS 0 | INPUT LINE 1 | SOURCE MAC ADDRESS 1 | DESTINATION MAC ADDRESS 1 | TRANSMISSION SOURCE IP ADDRESS 1 | DESTINATION IP ADDRESS 1 | TOS1 | TRANSMISSION SOURCE PORT NUMBER 1 | DESTINATION PORT NUMBER 1 — 601 |
| | INPUT LINE 2 | d.c. | d.c. | TRANSMISSION SOURCE IP ADDRESS 2 | DESTINATION IP ADDRESS 2 | TOS2 | TRANSMISSION SOURCE PORT NUMBER 2 | DESTINATION PORT NUMBER 2 — 602 |
| | INPUT LINE 9 | SOURCE MAC ADDRESS 1 | DESTINATION MAC ADDRESS 1 | TRANSMISSION SOURCE IP ADDRESS 1 | DESTINATION IP ADDRESS 1 | TOS1 | TRANSMISSION SOURCE PORT NUMBER 1 | DESTINATION PORT NUMBER 1 — 603 |
| | INPUT LINE 10 | SOURCE MAC ADDRESS 1 | DESTINATION MAC ADDRESS 1 | TRANSMISSION SOURCE IP ADDRESS 1 | DESTINATION IP ADDRESS 1 | TOS1 | TRANSMISSION SOURCE PORT NUMBER 1 | DESTINATION PORT NUMBER 1 — 604 |
| | INPUT LINE 10 | d.c. | d.c. | TRANSMISSION SOURCE IP ADDRESS 2 | DESTINATION IP ADDRESS 2 | TOS2 | TRANSMISSION SOURCE PORT NUMBER 2 | DESTINATION PORT NUMBER 2 — 605 |
| | INPUT LINE 10 | SOURCE MAC ADDRESS 1 | DESTINATION MAC ADDRESS 1 | TRANSMISSION SOURCE IP ADDRESS 1 | DESTINATION IP ADDRESS 1 | TOS1 | TRANSMISSION SOURCE PORT NUMBER 1 | DESTINATION PORT NUMBER 1 — 606 |
| | INPUT LINE 11 | d.c. | d.c. | TRANSMISSION SOURCE IP ADDRESS 2 | DESTINATION IP ADDRESS 2 | TOS2 | TRANSMISSION SOURCE PORT NUMBER 2 | DESTINATION PORT NUMBER 2 — 607 |
| ADDRESS n | INPUT LINE n | SOURCE MAC ADDRESS n | DESTINATION MAC ADDRESS n | TRANSMISSION SOURCE IP ADDRESS n | DESTINATION IP ADDRESS n | TOSn | TRANSMISSION SOURCE PORT NUMBER n | DESTINATION PORT NUMBER 1 — 608 | flow qos eco_on

FIG. 8

```
flow qos input_port1 eco_on
flow qos input_port2 eco_on
flow qos input_port3 eco_off
flow qos input_port4 eco_on
flow qos input_port5 eco_off
...
flow qos input_port1000 eco_on
```

FIG. 11A

PACKET TRANSFER APPARATUS

BACKGROUND OF THE INVENTION

1. Field of the Invention

The present invention relates to a packet transfer apparatus, and particularly to a packet transfer apparatus which constitutes a network and has a packet retrieval system for power saving.

2. Background Art

By the spread of a broadband service such as Asymmetric Digital Subscriber (ADSL) or Fiber To The Home (FTTH), streaming use of motion picture and sound promoted on the background of these broadband services, the raise of Peer to Peer (P2P) application and the like, Internet traffic increases exponentially, and it appears that this tendency continues after this (see, for example, non-patent document 1).

In order to configure a network which can cope with the increase of the Internet traffic, a packet transfer apparatus such as a high speed and large capacity router or a switch is required. Then, a process which becomes a bottle neck to the speed-up of the packet transfer apparatus and an example of a method of solving it will be described below.

A packet transfer apparatus performs a route retrieval for determining an output line of a received packet based on a destination IP address included in header information of the received packet or a destination MAC address, filtering for determining transfer advisability of a packet based on more detailed header information, or a flow retrieval for determining Quality of Service (QoS) as transfer priority of a packet.

In the case of the route retrieval, for each received packet, reference is made to a route table including, for example, hundreds of thousands of entries in which packet output lines are registered for the respective destination IP addresses or the respective destination MAC addresses, and the output line corresponding to the destination IP address of the received packet or the destination MAC address is determined.

In the case of the flow retrieval, a flow as the kind of a packet is defined as a combination of various header information such as a source IP address, a source MAC address, a Type of Service (TOS) in which priority is defined, a transmission source port to identify a communication use, a destination port and the like in addition to the destination IP address and the destination MAC address. For each of received packets, reference is made to a flow retrieval table including flow entries in which the flow definition is registered, the flow to which the received packet fits is identified, and transfer advisability based on previously set filtering or QoS is determined for each flow.

Since these retrieval processes require retrieval of a large capacity table or table retrieval based on many retrieval conditions, these are particularly heavy-load processes among processes in the packet transfer apparatus, and they are one of bottle necks to the speed-up of the packet transfer apparatus. Then, in a recent high-speed large-capacity packet transfer apparatus, a Content Addressable Memory (CAM) which is a high-speed device dedicated to retrieval is used for the route retrieval or the flow retrieval.

FIG. 19 shows a flow of a retrieval process by a CAM. A CAM 400 includes plural retrieval entries 1900 to 1909 having the same bit length. The bit length and the entry number of the retrieval entries of the CAM 400 are set according to the structure corresponding to the use of the CAM 400. For example, when the CAM 400 is applied to a route table, setting is made so that the structure satisfies the bit length and the entry number of route entries, and when the CAM 400 is applied to a flow retrieval table, setting is made so that the structure satisfies the bit length and the entry number of the flow entries.

A bit denoted by "x" of the retrieval entry is called a mask bit, and is a bit which is determined to be consistent even when the bit of a retrieval key 1910 is 0 or 1. When the retrieval key 1910 having the same bit length as the retrieval entry is inputted to the CAM 400, based on the retrieval key 1910, all the retrieval entries 1900 to 1909 of the CAM 400 are simultaneously compared for consistency, and when there is a consistent retrieval entry, hit information indicating the consistency and a hit address 1911 are outputted. The retrieval entries 1900 to 1909 are not sequentially compared for consistency, but all the retrieval entries 1900 to 1909 are simultaneously compared for consistency, and therefore, there is a feature that the retrieval can be performed at high speed. Incidentally, when there are plural consistent retrieval entries, the hit address of the youngest address among the consistent retrieval entries is outputted. Besides, when there is no consistent retrieval entry, no hit is indicated by not outputting the hit information.

The case of a specific setting example of the CAM 400 of FIG. 19 will be further described. The retrieval entry 1900 is determined to be inconsistent since the value of b2 is different from the retrieval key 1910. The retrieval entry 1901 is determined to be inconsistent since the values of b2 and b8 are different from the retrieval key 1910. The retrieval entry 1902 is determined to be inconsistent since the value of b2 is different from the retrieval key 1910. Since the retrieval entry 1903 is the same as the retrieval key 1910, it is determined to be consistent. Since b9 of the retrieval entry 1904 is a mask bit, even if b9 of the retrieval key is 0 or 1, the bit is determined to be consistent, and the other bits are also identical to the retrieval key 1910, the retrieval entry 1904 is determined to be consistent. The retrieval entry 1905 is determined to be inconsistent since the value of b2 is different from the retrieval key 1810. Since b8 and b9 of the retrieval entry 1906 are mask bits, even if b8 and b9 of the retrieval key are 0 or 1, the bits are determined to be consistent, and since the other bits are also identical to the retrieval key 1910, the retrieval entry 1906 is determined to be consistent. The retrieval entry 1907 is determined to be inconsistent since the value of b7 is different from the retrieval key 1910. The retrieval entry 1908 is determined to be inconsistent since the value of b0 is different from the retrieval key 1910. Since all bits b0 to b9 of the retrieval entry 1909 are mask bits, even if all bits b0 to b9 of the retrieval key are 0 or 1, the retrieval entry 1909 is determined to be consistent. From the above, the retrieval entries which are determined to be consistent are the entry 1903 of address 3 of the CAM 400, the entry 1904 of address 4 of the CAM 400, the entry 1906 of address 6 of the CAM 400, and the entry 1909 of address n of the CAM 400, and there are plural retrieval entries which are consistent. Among them, the retrieval entry of the youngest address is the retrieval entry 1903 of address 3, and therefore, the hit information and the hit address 3 are outputted (1911).

Non-patent document 1: "Energy Problem of Information Communication—Power Saving of Desired Communication Infrastructure", Ogasawara, June 2006, report of Ministry of Education, Culture, Sports, Science and Technology, National Institute of Science and Technology Policy, Science and Technology Trends Research Center, http://www.nistep.go.jp/achiev/ftx/jpn/stfc/stt063j/0606_03_featurearticles/0606fa 01/200606_fa01.html Non-patent document 2: "Power Saving System of Database Retrieval For Transfer in Network Node", Oku et al., 2005, The Institute of Electronics, Information and Communication Engineers, General Meeting B-6-153

Non-patent document 3: RFC2475, "An Architecture for Differentiated Services", December 1998

Non-patent document 4: RFC2597, "Assured Forwarding PHB Group", June 1999

Non-patent document 5: RFC2598, "An Expedited Forwarding PHB", June 1999

Non-patent document 6: RFC3697, "IPv6 Flow Label Specification", March 2004

SUMMARY OF THE INVENTION

On the background of the exponential increase of Internet traffic, the power consumption of a packet transfer apparatus is rapidly increased, and the Internet traffic is expected to be increased from now, and in view of these, it is pointed out that there is a danger that the energy consumption of communication equipments causes social energy bankruptcy in future. Thus, the reduction of power consumption of the packet transfer apparatus is strongly demanded (see, for example, non-patent document 1).

However, there is a problem that the power consumption of the CAM which is indispensable for speedup of the packet transfer apparatus is remarkably high in comparison with a general memory (see, for example, non-patent document 2). Accordingly, when the CAM is used for the route retrieval or the flow retrieval of the packet transfer apparatus, there is a problem that the power consumption of the packet transfer apparatus is increased. Also with respect to the reduction of power consumption of the CAM, in view of the retrieval system of the inside of the CAM, since it is necessary to feed power to all retrieval entries in the CAM, and consistency comparison must be performed simultaneously for all the retrieval entries together with the retrieval key, and therefore, it is conceivable that remarkable reduction of power consumption of the CAM will be difficult also in future.

Besides, in non-patent document 2, although the power saving system to restrict the physical Bank of a CAM as a retrieval object is proposed, it can not be applied to a CAM not including the physical Bank. Besides, even in the CAM including the physical Bank, the amount of power consumption which can be reduced when this system is used is limited by the number of physical Banks of the CAM, and when the number of physical Banks of the CAM is small, the amount of power consumption which can be reduced is also small.

In view of the above, it is an object of the invention to reduce the power consumption of a packet transfer apparatus. It is another object of the invention to provide a packet transfer apparatus in which plural retrieval units are included and a retrieval unit is selected in view of power saving and a retrieval key as the need arises. It is still another object of the invention to provide a packet transfer apparatus using a CAM, in which the power consumption of flow retrieval and route retrieval is reduced.

The present invention has been made to solve the foregoing problems and can be realized as the following modes or application examples.

Application Example 1

A packet transfer apparatus of application example 1 is a packet transfer apparatus which is connected to plural input lines and plural output lines and transfers a packet received from each input line to an output line specified by header information, and includes a flow retrieval section to retrieve a flow to which the packet belongs while the header information of the packet is used as a retrieval key, and a unit to execute transfer control, which is previously specified for each flow, to the packet, the flow retrieval section includes plural retrieval units, and a power consumption control unit to control power consumption resulting from retrieval by selecting a header information item to be included in the retrieval key. Further, in the power consumption control unit, when the header information item to be included in the retrieval key is selected, the retrieval unit is selected according to the selected header information item, and the flow retrieval is executed.

The packet transfer apparatus of application example 1 includes the retrieval unit in which, when the flow retrieval is executed, the bit length, the item number and the like of the header information as the retrieval key are large although the power consumption is high, and the retrieval unit in which the bit length, the item number and the like of the header information as the retrieval key are small although the power consumption is low, and the optimum retrieval unit can be selected in view of the power saving and the retrieval key as the need arises.

When the retrieval unit in which the bit length, the item number and the like of the header information as the retrieval key are small is selected, the number of bits required for setting the flow is decreased. Accordingly, when comparison is made in the retrieval unit having the same bit capacity, the number of flows which can be set as the retrieval objects can be increased.

Application Example 2

The packet transfer apparatus of application example 1 further includes a setting interface by which a manager of the packet transfer apparatus selects the header information item to be included in the retrieval key.

According to the packet transfer apparatus of application example 2, based on the determination of the manager of the packet transfer apparatus, the optimum header information item to be included in the retrieval key and the optimum flow retrieval unit can be selected.

Application Example 3

A packet transfer apparatus of application example 3 is such that in the packet transfer apparatus of application example 1 or application example 2, the header information item to be included in the retrieval key is selected for each of the packet input lines or output lines, logical input interfaces or logical output interfaces.

According to the packet transfer apparatus of the application example 3, the optimum header information item and the optimum retrieval unit can be selected for each of units for setting a list of flow definitions, such as the packet input lines or output lines, the logical input interfaces or the logical output interfaces.

Application Example 4

A packet transfer apparatus of application example 4 is such that in the packet transfer apparatus of application example 1 or 2, the header information item to be included in the retrieval key is selected according to a value of at least one header information item of the header information of the packet.

According to the packet transfer apparatus of application example 4, the optimum header information item and the optimum retrieval unit can be selected based on the condition determined by part of the header information.

Application Example 5

A packet transfer apparatus of application example 5 is such that in the packet transfer apparatus of application example 4, the header information item to be included in the retrieval key is selected according to the value of the header information item indicating priority.

According to the packet transfer apparatus of application example 5, for the packet in which the priority is already set as the header information, the flow retrieval can be executed by a small scale table of low power consumption.

Application Example 6

A packet transfer apparatus of application example 6 is such that in the packet transfer apparatus of application example 5, the header information item to be included in the retrieval key is selected according to, as the header information item indicating the priority, especially all of or part of at least TOS (Type of Service) of IPv4 (Internet Protocol version 4) or TC (Traffic Class) of IPv6 (Internet Protocol version 6), or according to a value of at least one of EXP (experimental bits) of MPLS (Multiprotocol Label Switching) and COS (Class of Service) of IEEE802.1p.

According to the packet transfer apparatus of application example 6, for the packet in which the priority is already set as the header information of all of or part of TOS (Type of Service) of IPv4 or TC (Traffic Class) of IPv6, or at least one of EXP (experimental bits) of MPLS or COS (Class of Service) of IEEE802.1p, the flow retrieval can be executed by the small scale table having low power consumption.

Application Example 7

A packet transfer apparatus of application example 7 is such that in the packet transfer apparatus of application example 4, the header information item to be included in the retrieval key is selected particularly according to the value of the header information item indicating the flow.

According to the packet transfer apparatus of application example 7, for the packet in which the flow is already set as the header information, the flow retrieval can be omitted.

Application Example 8

A packet transfer apparatus of application example 8 is such that in the packet transfer apparatus of application example 7, the header information item to be included in the retrieval key is selected according to, as the header information item indicating the flow, especially at least a value of FL (Flow Label) of IPv6.

According to the packet transfer apparatus of application example 8, for the packet in which the flow is already set as the FL (Flow Label) of IPv6, the flow retrieval can be omitted.

Application Example 9

A packet transfer apparatus of application example 9 is a packet transfer apparatus which is connected to plural input and output lines, and transfers a packet received from each of the input lines to an output line specified by header information, and includes a route retrieval section to determine the output line for transferring the packet while a header information item including at least destination information of the packet in the header information of each reception packet is used as a retrieval key, the route retrieval section includes plural retrieval units, and one of the retrieval units is selected to execute route retrieval, so that power consumption resulting from the retrieval is controlled.

According to the packet transfer apparatus of application example 9, when the route retrieval is executed, there are provided the retrieval unit having high retrieval performance although the power consumption is high, and the retrieval unit having low power consumption although the retrieval performance is low, and the optimum retrieval unit can be selected in view of the power consumption and the retrieval performance as the need arises.

Application Example 10

A packet transfer apparatus of application example 10 further includes, in the packet transfer apparatus of application example 9, a setting interface by which a manager of the packet transfer apparatus sets which retrieval unit is selected from the plural retrieval units included in the route retrieval section.

According to the packet transfer apparatus of application example 10, the optimum route retrieval unit can be selected based on the determination of the manager of the packet transfer apparatus.

Application Example 11

A packet transfer apparatus of application example 11 is such that in the packet transfer apparatus of one of application examples 9 and 10, the retrieval unit is selected according to a value of the header information item indicating a communication protocol, and the route retrieval is executed.

According to the packet transfer apparatus of application example 11, the optimum route retrieval unit can be selected according to the communication protocol.

Application Example 12

A packet transfer apparatus of application example 12 is such that in the packet transfer apparatus of application example 11, the retrieval unit is selected according to, as the header information item indicating the communication protocol, especially a value of one of at least Protocol of PPP, Ether Type of Ethernet (registered trade mark), and VER (Version) of IP, and the route retrieval is executed.

According to the packet transfer apparatus of application example 12, the optimum route retrieval unit can be selected according to the communication protocol determined by Protocol of PPP, Ether type of Ethernet (registered trademark), or VER (Version) of IP.

Application Example 13

A packet transfer apparatus of application examples 13 is such that in the packet transfer apparatus of any one of application examples 1 to 12, one of the retrieval units includes a CAM (Content Addressable Memory).

In general, although there is a problem that the power consumption of the CAM is high, according to the packet transfer apparatus of application example 13, for the retrieval key for which retrieval can be performed by a retrieval unit having low power consumption other than the CAM, the retrieval unit having low power consumption other than the CAM is selected, so that an effect of reducing the power consumption can be obtained.

In the invention, the foregoing various modes can be applied while they are suitably combined, or part thereof is omitted.

According to the first solving means of this invention, there is provided a packet transfer apparatus which can be connected to a plurality of input lines and a plurality of output lines, and transfers a packet received from each of the input lines to one of the output lines specified by header information, comprising:

a reception circuit to receive the packet through the input line;

a flow retrieval section to obtain a priority based on the header information of the received packet;

a relay section to transfer the packet; and an output circuit to output the packet transferred from the relay section through the output line, wherein the flow retrieval section includes:

a determination section to execute, in accordance with previously set setting information or a previously determined header information item of the header information of the packet, a first process of outputting a plurality of header information items for identifying a flow or a second process of outputting a header information item indicating a priority extracted from the header information of the received packet;

a first retrieval unit that inputs the plurality of header information items from the determination section, identifies the flow of the packet by using the plurality of header information items as a retrieval key, and obtains a priority previously specified for each flow; and a second retrieval unit that includes a conversion table in which priorities are previously stored correspondingly to header information items indicating priorities, inputs the header information item indicating the priority from the determination section, refers to the conversion table to obtain the priority by using the header information item indicating the priority as a retrieval key, and power consumption of the second retrieval unit is lower than power consumption of the first retrieval unit, and the packet transfer apparatus transfers and controls the packet in accordance with the obtained priority.

According to the second solving means of this invention, there is provided a packet transfer apparatus which can be connected to a plurality of input lines and a plurality of output lines, and transfers a packet received from each of the input lines to one of the output lines specified by header information, comprising:

a reception circuit to receive the packet through the input line;

a flow retrieval section to obtain a priority based on the header information of the received packet;

a relay section to transfer the packet; and an output circuit to output the packet transferred from the relay section through the output line, wherein the flow retrieval section includes:

a determination section to execute a first process of outputting a plurality of header information items which are extracted from the header information of the received packet and are for identifying a flow or a second process of outputting a header information item extracted from the header information of the received packet and indicating a flow in accordance with whether the header information item indicating the flow is set in the header information of the packet or not;

a first retrieval unit that inputs the plurality of header information items from the determination section, identifies the flow of the packet by using the plurality of header information items as a retrieval key, and obtains a priority previously specified for each flow; and a second retrieval unit that inputs the header information item indicating the flow from the determination section, refers to a conversion table, in which priorities are previously stored, correspondingly to the header information items indicating the flow, and obtains the priority, and power consumption of the second retrieval unit is lower than power consumption of the first retrieval unit, and the packet transfer apparatus transfers and controls the packet in accordance with the obtained priority.

According to the third solving means of this invention, there is provided a packet transfer apparatus which can be connected to a plurality of input lines and a plurality of output lines, and transfers a packet received from each of the input lines to one of the output lines specified by header information, comprising:

a reception circuit to receive the packet through the input line;

a route retrieval section to obtain output line information based on a destination address of the received packet;

a relay section to transfer packet in accordance with the output line information; and an output circuit to output the packet transferred from the relay section through the output line, wherein the route retrieval section includes:

a first retrieval unit that obtains, based on the destination address of the packet, the corresponding output line information;

a second retrieval unit that obtains, based on the destination address of the packet, the corresponding output line information and power consumption of the second retrieval unit lower than power consumption of the first retrieval unit; and a determination section to determine that output line information is obtained by which of the first retrieval unit and the second retrieval unit in accordance with a communication protocol of the received packet or previously set setting information.

According to the invention, the power consumption of the packet transfer apparatus can be reduced. Besides, according to the invention, the plural retrieval units are provided, and the retrieval unit can be selected in view of the power saving and the retrieval key as the need arises. According to the invention, in the packet transfer apparatus using the CAM, the power consumption of the flow retrieval and the route retrieval can be reduced. According to the invention, when FF or RGF, instead of the CAM, is made the retrieval unit, the number of flows which can be set as the retrieval objects can be increased.

BRIEF DESCRIPTION OF THE DRAWINGS

FIG. 6 is a view showing a format example of a CAM.

FIG. 8 is a view showing a setting example of the invention for QoS retrieval.

FIGS. 11A and 11B are view showing a setting example of a flow list of the invention.

DETAILED DESCRIPTION OF THE INVENTION

1. First Embodiment

First, a first embodiment will be described.

Figure 1:
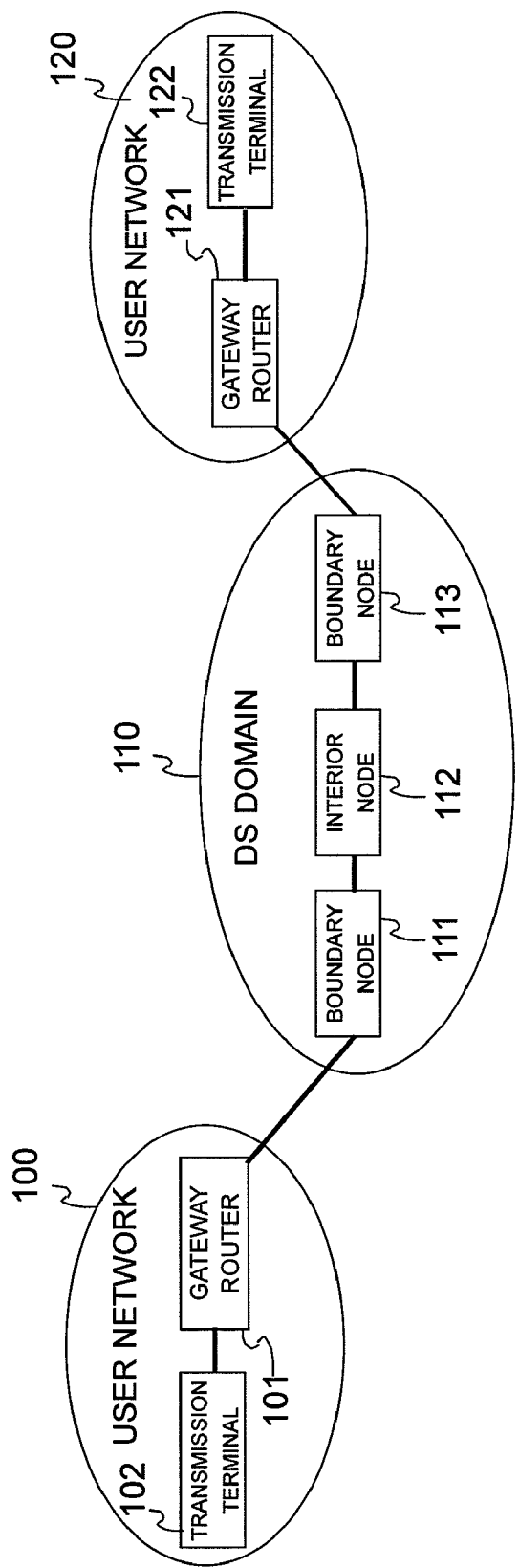
FIG. 1 is a view showing a network structural example as a DS domain.

FIG. 1 is a view showing an example of a network structure to which the first embodiment is applied.

It is assumed that TCP/IP communication is performed from a gateway router 101 arranged in a user network 100 to a gateway router 121 arranged in a user network 120 through a DS domain 110 specified in RFC 2475 (non-patent document 3). Incidentally, an L4 protocol is not the TCP but may be another protocol such as UDP (User Datagram Protocol). The DS domain 110 is a network to which a Diff-serv (Differentiated Services) function is applied. The DS domain 110 includes, for example, boundary nodes 111 and 113 and an interior node 112. Besides, the gateway routers 101 and 121 are connected to, for example, transmission terminals 102 and 122, respectively.

Figure 2:
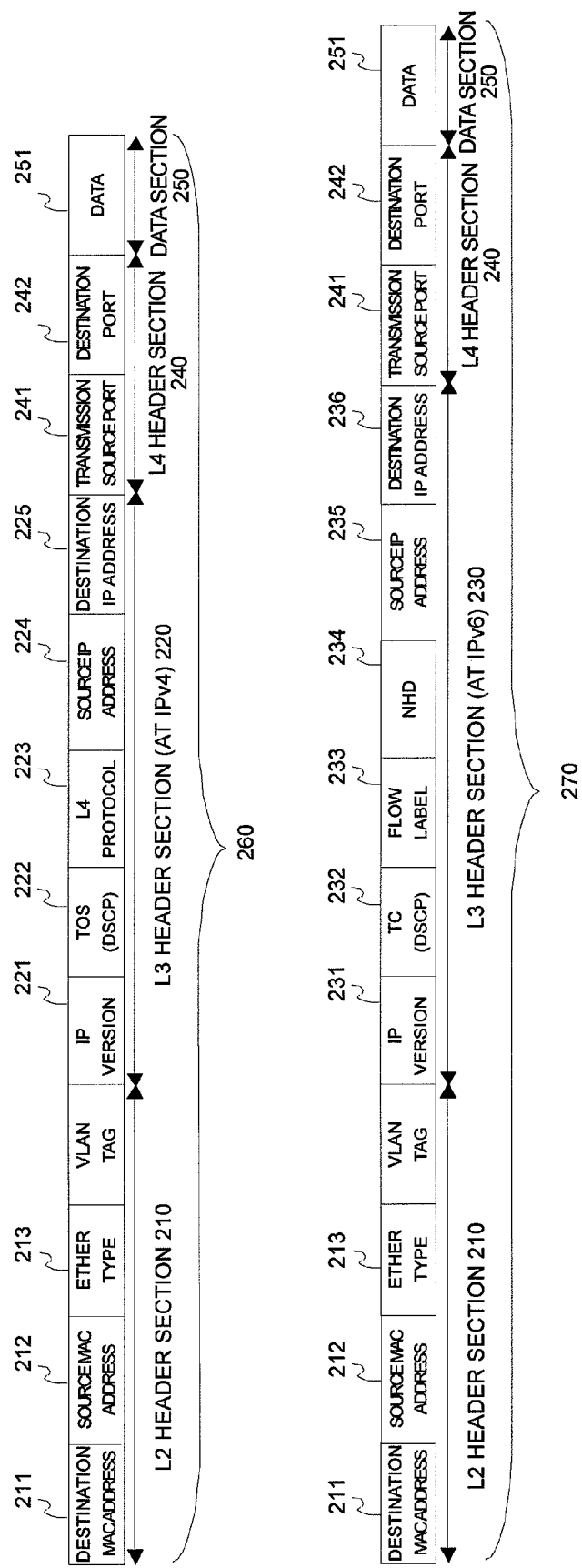
FIG. 2 is a structural view of a packet header.

FIG. 2 shows a packet header of the IP communication. The structure of the packet header in the case of IPv4 communication is as shown in a header 260, and the structure of the packet header in the case of IPv6 communication is as shown in a header 270.

The boundary node 111 arranged at the boundary of an inlet of the DS domain 110 inputs a packet outputted by the transmission terminal 102 of the user network 100 through the gateway router 101 to the DS domain 110. According to RFC 2475, in the boundary node 111, a process called marking is performed in which a flow is identified based on a TCP header (L4 header section) 240/IP header (L3 header section) 220 or 230, and the priority defined for each flow is written as dscp (DiffServ Code Point) of the high six bits of TOS222 or TC232 in the IP header. The packet in which the dscp is marked in the boundary node 111 is next inputted to the interior node 112. In the interior node 112, the flow is identified based on only the dscp marked in the boundary node 111, and priority control is performed in accordance with the priority of the dscp. The packet outputted from the interior node 112 is next inputted to the boundary node 113. In the boundary node 113, the flow is identified based on the TCP/IP header, the priority control defined for each flow is executed, and the packet is inputted to the reception terminal 122 through the gateway router 121 arranged in the user network 120.

In this embodiment, the embodiment to the interior node 112 in the DS domain 110 will be described.

Figure 3:
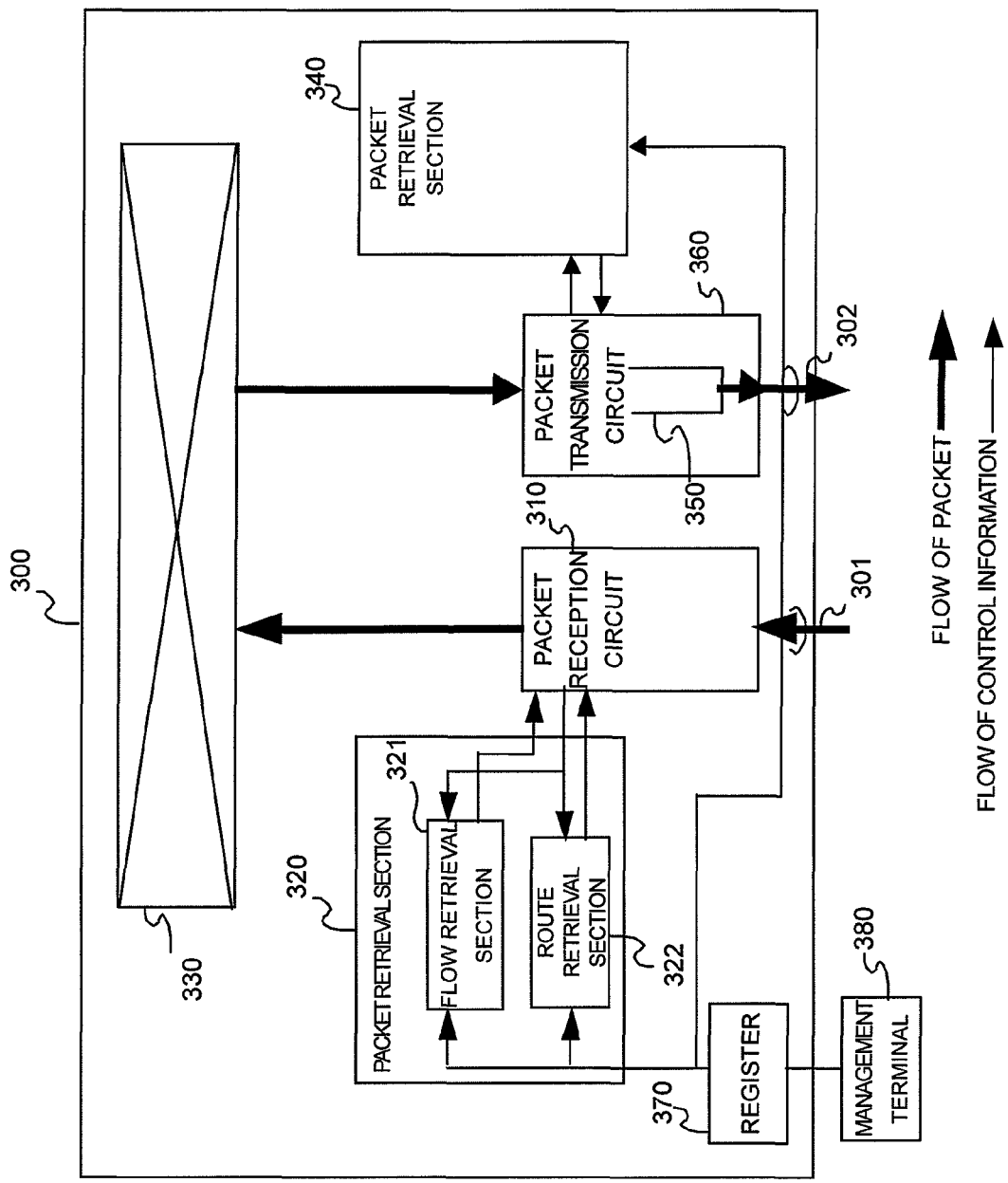
FIG. 3 is a block diagram of a packet transfer apparatus.

FIG. 3 is a block diagram of a packet transfer apparatus 300 which is applied as the interior node 112. Incidentally, for example, a router for routing and transferring a packet or a switch for switching and transferring a packet is applied as the packet transfer apparatus 300.

The packet transfer apparatus 300 includes an input line 301 for packet input, a packet reception circuit 310 for performing a reception process of a packet, an output line 302 for packet output, a packet retrieval section 320 to an input packet, a packet relay processing unit 330 to switch a packet based on an output line number, a packet retrieval section 340 to an output packet, a packet transmission circuit 360 to read a packet from a transmission buffer 350 and to perform a transmission process of the packet, and a register 370 for temporarily storing setting information from a management terminal 380. Besides, the packet transfer apparatus 300 includes a memory such as a CAM and a RAM. The memory stores, for example, a flow retrieval table, an output line table and the like. Incidentally, the details of the memory will be described later. The packet retrieval section 320 includes a route retrieval section 322 to determine the output line number for identifying the output line 302 and a flow retrieval section 321 to retrieve the flow.

The transmission buffer 350 includes plural queues whose priorities are determined, and stores the packet in the queue in accordance with a QoS determination result in the flow retrieval section 321. Besides, the management terminal 380 is connected to the packet transfer apparatus 300, and performs management of the packet transfer apparatus 300 and various settings through the register 370. Incidentally, in FIG. 3, although the one input line 301 and the one output line 302 are illustrated, plural lines may be connected to the one packet reception circuit. Besides, the packet transfer apparatus 300 may include plural input lines, plural packet reception circuits, plural header processing sections (packet retrieval sections), plural transmission buffers, plural packet transmission circuits, and plural output lines. Similarly to the input side packet retrieval sections 320, the output side packet retrieval section 340 can include a flow retrieval section and a route retrieval section. Incidentally, in the output side packet retrieval section 340, the route retrieval section may be omitted.

The packet transmitted from the transmission terminal 102 or 122 is inputted to the packet reception circuit 310 through one of the input lines. The packet reception circuit 310 temporarily stores the inputted packet in a buffer. Besides, the number of the input line 301 through which the packet is inputted is stored in the inner header. The packet reception circuit 310 transmits the inner header including the input line number and the packet header 260 or 270 to the packet retrieval section 320.

The flow retrieval section 321 of the packet retrieval section 320 retrieves the flow retrieval table by the inner header and the packet header 260 or 270. Transfer advisability by previously set filtering or QoS is determined for each retrieved flow, and the determination result is returned to the packet reception circuit 310.

The route retrieval section 322 of the packet retrieval section 320 retrieves the route table by the inner header and the packet header 260 or 270. The previously set output line number of the packet is determined for each retrieved route, and the determination result is returned to the packet retrieval section 310.

The packet reception circuit 310 adds the flow retrieval result and the route retrieval result in the packet retrieval section 320 to the inner header, and transfers the packet, together with the packet header 260 or 270, to the packet relay processing unit 330. In the flow retrieval result, when it is determined that the transfer is not performed by filtering, the packet is not transferred to the packet relay processing unit 330, but is discarded. Based on the output line number of the packet included in the route retrieval result of the inner header, the packet relay processing unit 330 transfers the packet to the packet transmission circuit 360 containing the output line of the packet. In the transmission buffer 350, the packet is stored in a desired queue of the transmission buffer 350 in accordance with the QoS included in the flow retrieval result of the inner header. The packet retrieval section 340 executes the flow retrieval and the route retrieval based on the inner header and the packet header from the packet transmission circuit 360. Incidentally, the route retrieval may be omitted. The packet transmission circuit 360 reads the packet from the transmission buffer 350, and performs the communication process of the packet from the output line 320.

Figure 4A:
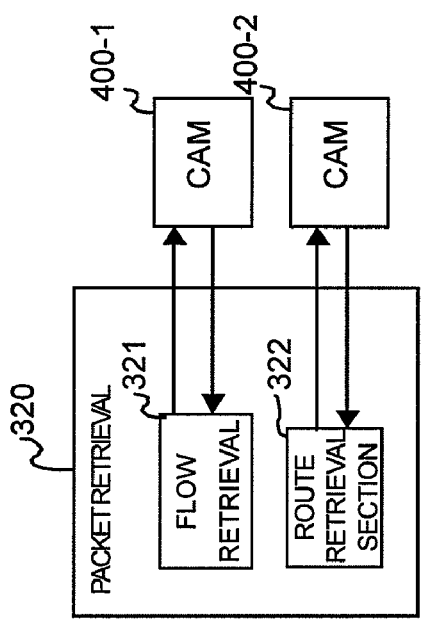
FIGS. 4A and 4B are view showing a connection form of a packet retrieval section and a CAM.
Figure 4B:
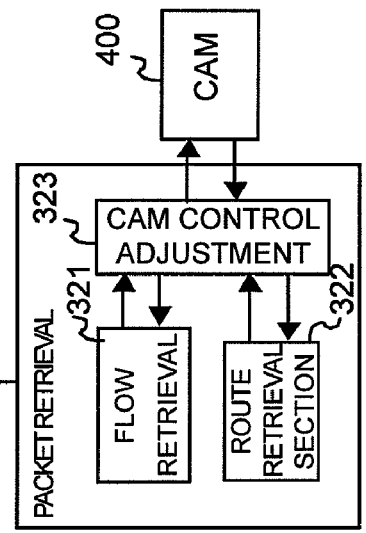

In the flow retrieval in the flow retrieval section 321 of the packet retrieval section 320 and the route retrieval in the route retrieval section 322, a device CAM 400 dedicated to retrieval is used to increase the speed of the retrieval. FIGS. 4A and 4B show two kinds (i) and (ii) as the connection mode between the CAM 400 and the flow retrieval section 321 and between the cam and the route retrieval section 322. This embodiment can be applied to both of the connection modes of (i) and (ii).

In FIG. 4A, two CAMs 400 are used. The connection between the flow retrieval section 321 and a CAM 400-1 and the connection between the route retrieval section 322 and another CAM 400-2 are independent of each other, and each of the flow retrieval section 321 and the route retrieval section 322 can occupy and use the CAM.

In FIG. 4B, the packet retrieval section 320 further includes a CAM control adjustment section 323, and uses one CAM 400. A retrieval request from the flow retrieval section 321 and a retrieval request from the route retrieval section 322 are adjusted by the CAM control adjustment section 323, so that the retrieval requests do not conflict with each other, and the retrieval request is applied to the CAM 400. Also with respect to the retrieval results, a determination is made in the CAM control adjustment section 323, and the retrieval result to the retrieval request from the flow retrieval section 321 is returned to the flow retrieval section 321, and the retrieval result to the retrieval request from the route retrieval section 322 is returned to the route retrieval section 322. As stated above, in (ii), the flow retrieval section 321 and the route retrieval section 322 share the one CAM 400 and can use it.

In the case of (i), although the cost is increased since the plural processings are performed in the CAMs 400, the retrieval speed is twice faster than that of the case of (ii), and further, there is also a merit that the CAM control adjustment section 323 is not required. In the case of (ii), since the one CAM 400 is used, the cost can be reduced, however, the retrieval speed is half that of the case of (i), and further, the CAM control adjustment section 323 is also required.

Figure 5:
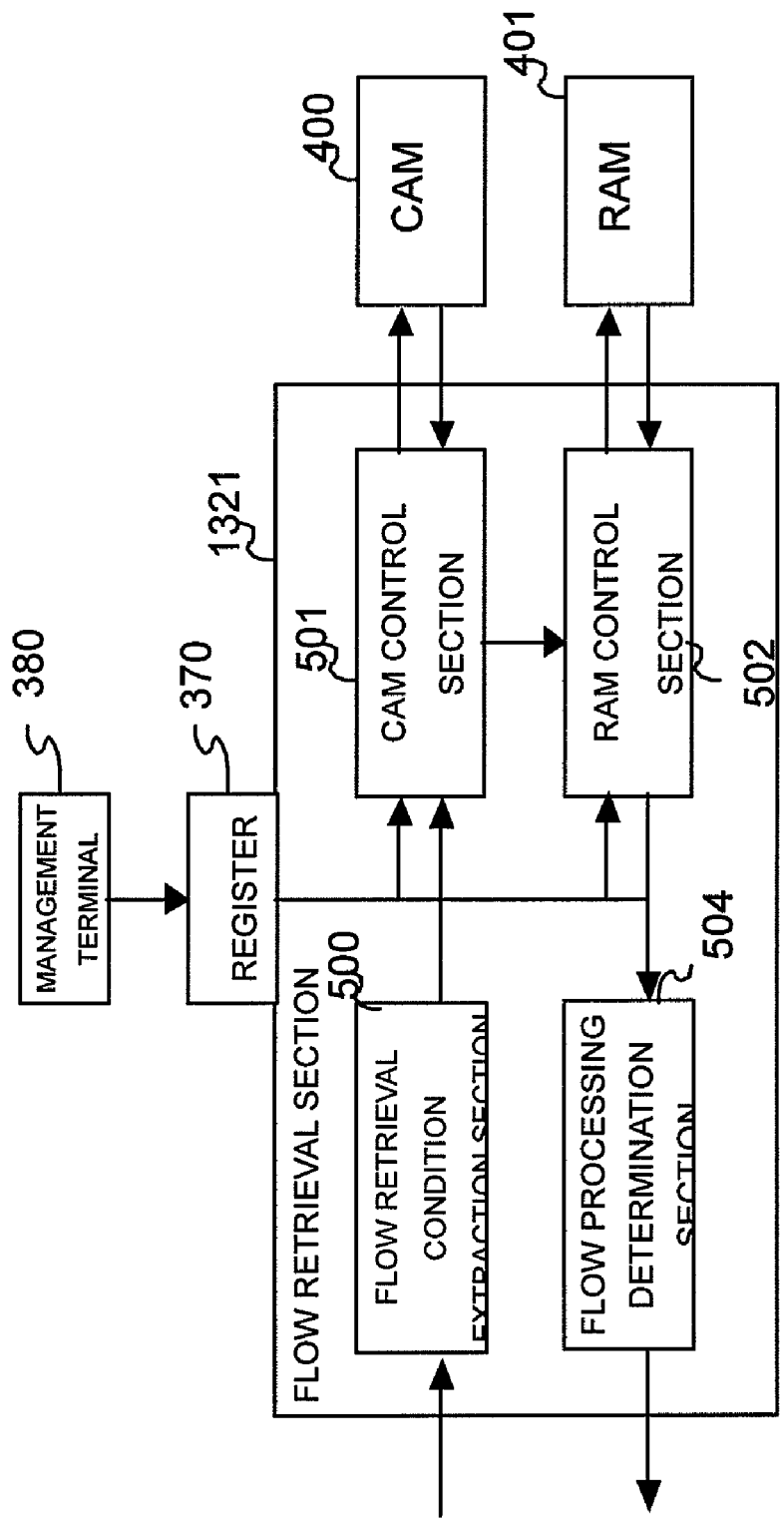
FIG. 5 is a block diagram of a flow retrieval section using a CAM in the related art.

FIG. 5 shows an example of a structure of a flow retrieval section 1321 using a CAM in the related art. FIG. 6 shows a structural example of a flow retrieval table. Incidentally, the structure shown in FIG. 5 and the following description are for facilitating the understanding of this embodiment, and do not necessarily constitute the related art.

The flow retrieval section 1321 includes, for example, a flow retrieval condition extraction section 500, a CAM control section 501, a RAM control section 502, and a flow processing determination section 504. A CAM 400 stores a flow retrieval table, and a RAM 401 stores a priority table.

The flow retrieval condition extraction section 500 of the flow retrieval section 1321 receives the inner header including the input line number and the packet header 260 or 270 from the packet reception circuit 310, extracts information required for the flow retrieval, and transmits it to the CAM control section 501. For example, when the flow retrieval table constituted by the CAM 400 includes, as shown in FIG. 6, flow entries 601 to 608 in each of which an input line number, a source MAC address, a destination MAC address, a source IP address, a destination IP address, a TOS, a transmission source port number, and a destination port number are flow retrieval conditions, the flow retrieval condition extraction section 500 transmits the input line number of the inner header, the source MAC address, destination MAC address, source IP address, destination IP address, TOS, transmission source port number, and destination port number of the packet header 260 to the CAM control section 501.

In FIG. 6, a field item recited as "d.c." is constituted of a mask bit, and the value of the field is not used for consistency determination of the flow retrieval. When there are plural uses in the flow retrieval, such as filtering and QoS, the flow retrieval table is independently provided for each use. For example, the flow retrieval table for filtering and the flow retrieval table for QoS are independently provided. Hereinafter, the retrieval process of the flow retrieval table for QoS will be described.

The CAM control section 501 transmits information in which the inner header including the input line number and transmitted from the flow retrieval condition extraction section 500 and the packet header 260 or 270 are rearranged in accordance with the format of the flow retrieval table, as a retrieval key, together with a retrieval request signal to the CAM 400 constituting the flow retrieval table, to the CAM 400. The CAM 400 retrieves the flow retrieval table by using the retrieval key transmitted from the CAM control section 501, and returns an address of a flow entry consistent with the retrieval key, as a hit address, to the CAM control section 501. The CAM control section 501 transmits the hit address transmitted from the CAM 400 to the RAM control section 502.

From the hit address transmitted from the CAM control section 501, correspondingly to this, the RAM control section 502 calculates an address used when reference is made to the RAM 401, and makes a read request to the RAM 401 while the calculated address is made a read address.

Figure 7:
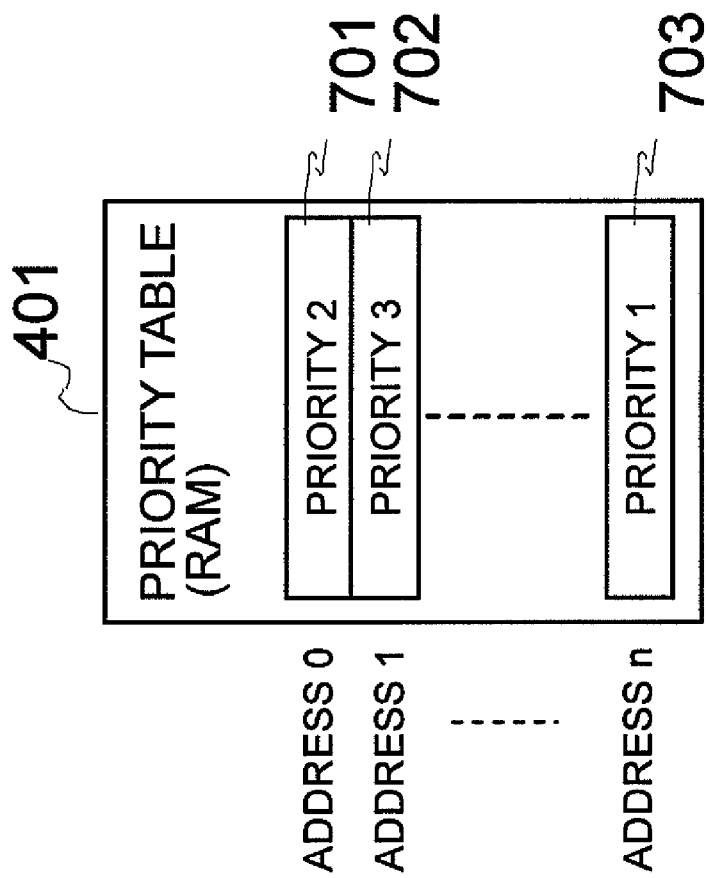
FIG. 7 is a view showing a format example of a RAM.

FIG. 7 shows a structural example of a priority table 401 of the RAM 401.

The priority table 401 includes priority entries 701 to 703 which correspond to the flow entries 601 to 608 and in which the priority to the flow consistent with each flow entry is set. The RAM 401 transmits, as read data, data (priority) set in the entry at the inputted read address to the RAM control section 502. The RAM control section 502 transmits the read data transmitted from the RAM 401 to the flow processing determination section 504. The flow processing determination section 504 extracts information required for the determination process of QoS from the read data, and obtains the determination result of QoS. The flow processing determination section 504 transmits the determination result of QoS to the packet reception circuit 310.

Incidentally, in order to enable table setting for the CAM 400 or the RAM 401, the flow retrieval section 321 is connected with the management terminal 380, and the setting information from the management terminal 380 is temporarily stored in the register 370. The CAM control section 501 to control the CAM 400 performs management of the CAM 400 and various settings in accordance with the information read from the register 370. Besides, the RAM control section 502 to control the RAM performs management of the RAM 401 and various settings.

Figure 9:
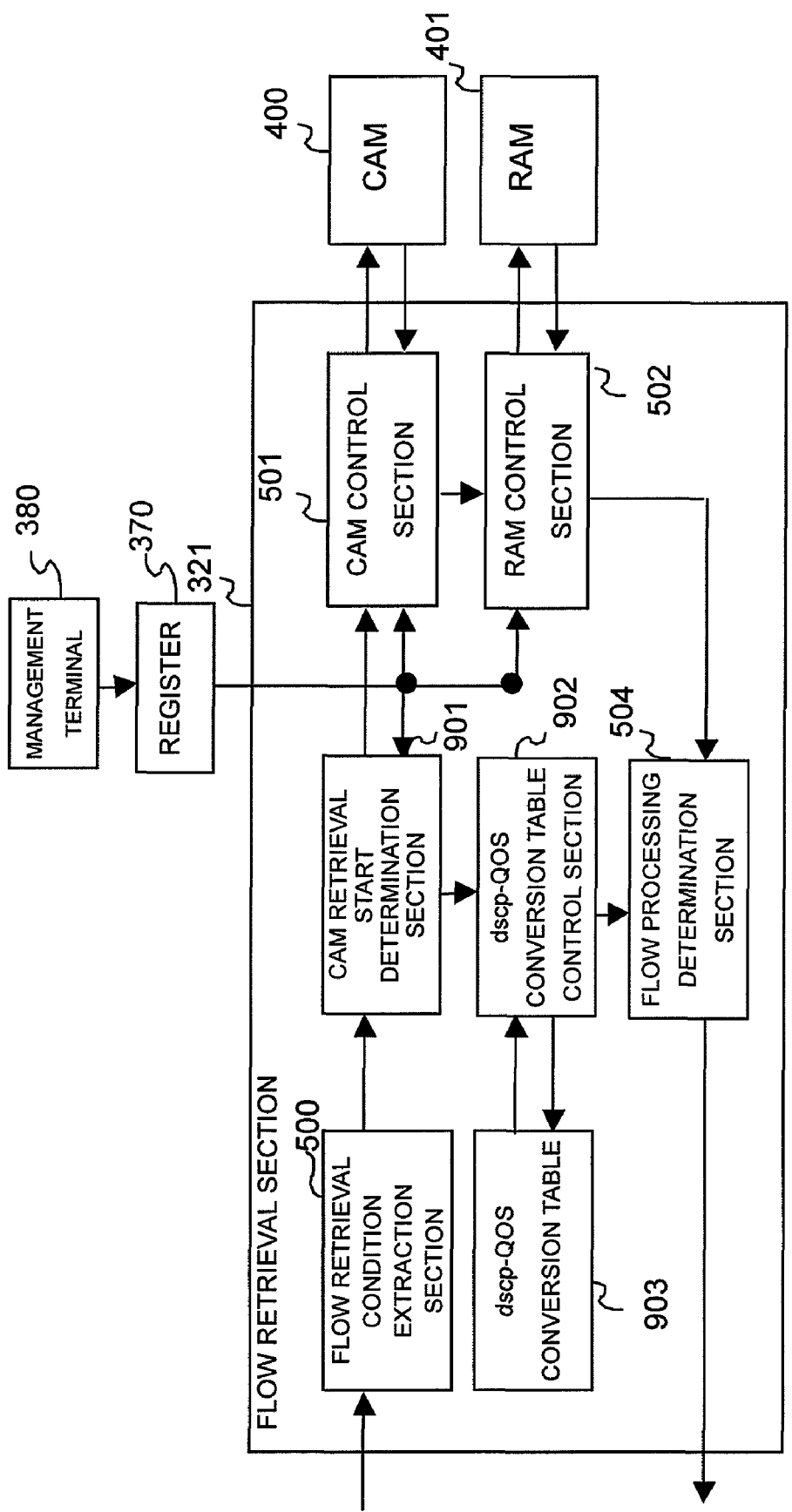
FIG. 9 is a block diagram of a flow retrieval section of a first embodiment.

FIG. 9 is a structural view of the flow retrieval section 321 of this embodiment.

The flow retrieval section 321 of this embodiment further includes, in addition to the structure of the flow retrieval section 1321 using the CAM shown in FIG. 5, a CAM retrieval start determination section 901, a dscp-QOS conversion table control section 902, and a dscp-QOS conversion table 903.

Figure 10:
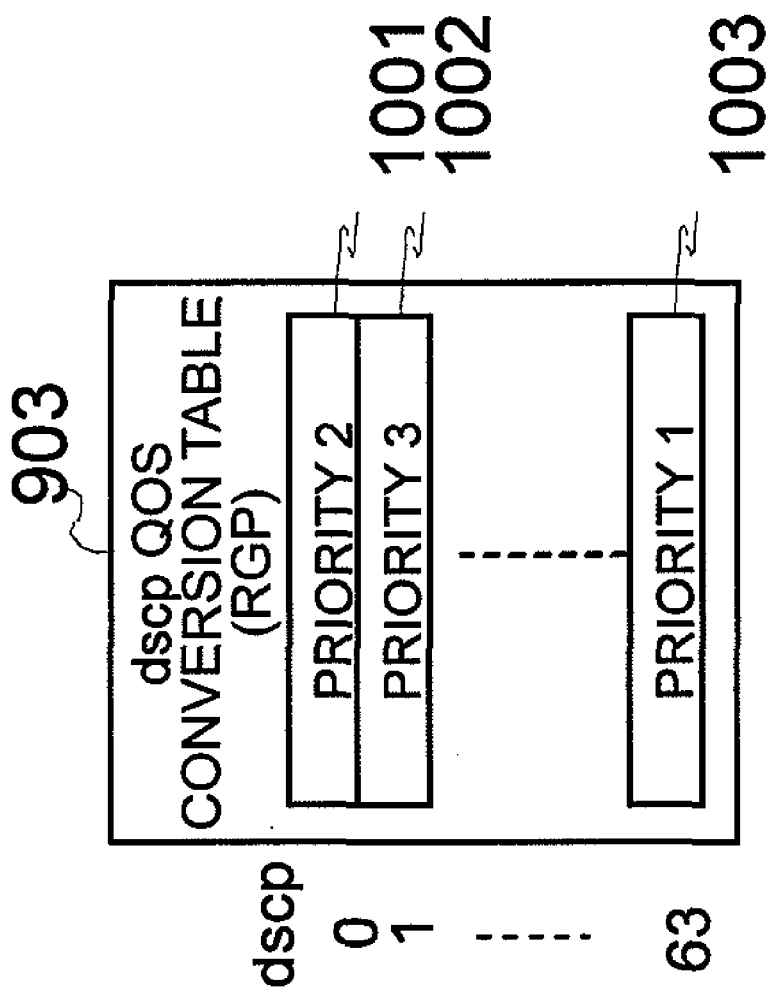
FIG. 10 is a format structural view of a dscp-QOS conversion table.

FIG. 10 shows a structural example of the dscp-QOS conversion table 903.

The dscp-QOS conversion table 903 is, for example, a table for determining QoS uniquely from dscp. For example, as shown in FIG. 10, the dscp-QOS conversion table 903 includes priority entries 1001 to 1003 in which priority to a flow having each dscp is set correspondingly to values 0 to 63 of the dscp.

Since the range of the values of the dscp is limited to 0 to 63 according to the current specification of header information, the dscp-QOS conversion table 903 has only to have at most 64 entries. Accordingly, it is not necessary to use a large capacity CAM, and the conversion table can be constituted by a physical device having small bit capacity, such as a FF (Flip Flop) or an RGF (Register File). Since the bit capacity is small, the power consumption when reference is made can be suppressed. Incidentally, when the number of bits of the dscp is changed by enlargement of the header of a packet or the like, or when a variable value is used for the dscp, the dscp-QOS conversion table can include the number of entries corresponding to the number of bits.

Besides, when a read access is once made to the dscp-QOS conversion table 903 by the read address uniquely calculated from the dscp, QoS can be determined, and therefore, also from the viewpoint of retrieval performance, the performance comparable to the CAM can be obtained.

When the CAM is applied to the flow retrieval of the case where QoS is uniquely determined from the dscp, as is understood from FIG. 6, also with respect to the fields of the input line, the transmission MAC address, the destination MAC address, the source IP address, the destination IP address, the transmission source port number, and the destination port number, which are not required for the consistency determination of the flow retrieval, the mask bit is made x, and setting of "d.c" must be performed, and therefore, the bit capacity of the CAM is wastefully used.

On the other hand, when the dscp-QOS conversion table 903 is applied, as is understood from FIG. 10, since the setting corresponding to a field not required to be included in the consistency determination of the flow retrieval is not required, the bit capacity of the dscp-QOS conversion table 903 is not wastefully used. Since the bit capacity of the CAM is not wastefully used, and the dscp-QOS conversion table 903 itself can be constituted by a physical device having small bit capacity, the bit use efficiency of the flow entry is improved, and the number of flows which can be set as retrieval objects can be increased.

Figure 8:
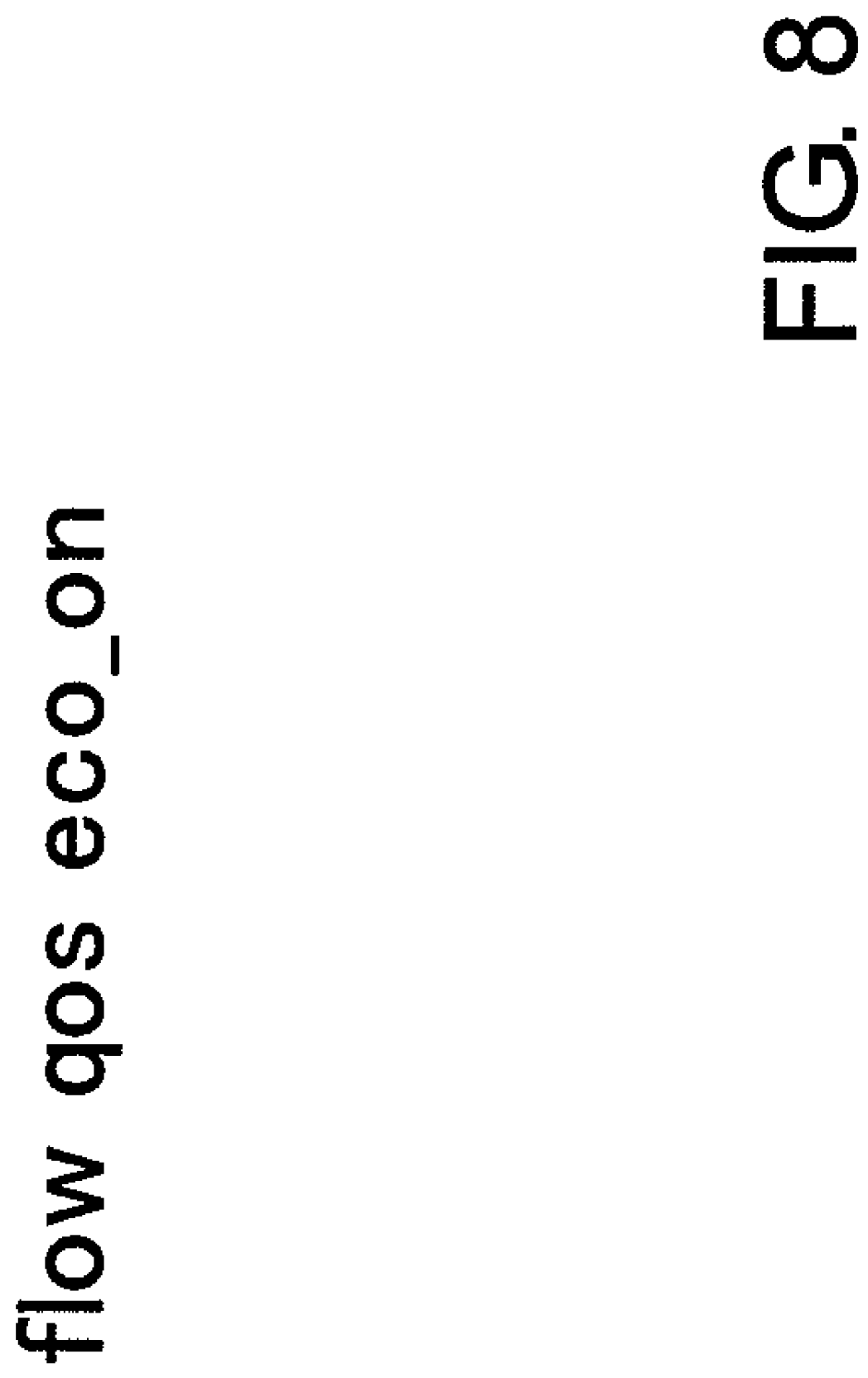

FIG. 8 shows a setting example from a user interface (management terminal) relating to the advisability of a CAM retrieval start. The CAM retrieval start determination section 901 can be set from the management terminal 380 through the register 370, and according to this setting, it is possible to select whether the CAM retrieval is started or not. FIG. 8 shows an example, as apparatus setting, of an instruction input (or command) for setting a retrieval unit having lower power consumption without starting the CAM retrieval at the time of retrieval of QoS.

In the setting of starting the CAM retrieval, the CAM retrieval start determination section 901 outputs plural header information items for identifying the flow, which are extracted from the header information of the received packet, to the CAM control section 501 (first process).

In the setting of not starting the CAM retrieval, the CAM retrieval start determination section 901 extracts dscp in the packet header 260 or 270 transmitted from the flow retrieval condition extraction section 500 and transmits it to the dscp-QOS conversion table control section 902 (second process). Incidentally, the function of the flow retrieval condition extraction section 500 is made to be included in the CAM retrieval start determination section 901, and when the CAM retrieval is not started, the CAM retrieval start determination section 901 extracts the dscp from the header information, and when the CAM retrieval is started, similarly to the flow retrieval condition extraction section 500, the CAM retrieval start determination section 901 may extract the retrieval key. In the dscp-QOS conversion table control section 902, from the dscp transmitted from the CAM retrieval start determination section 901, an address used when reference is made to the dscp-QOS conversion table 903 is calculated correspondingly to this, and a read request is made to the dscp-QOS conversion table 903 while the calculated address is made the read address.

The dscp-QOS conversion table 903 transmits, as read data, data (priority) set in the entry of the read address to the dscp-QOS conversion table control section 902. The dscp-QOS conversion table control section 902 transmits the read data transmitted from the dscp-QOS conversion table 903 to the flow processing determination section 504. The flow processing determination section 504 extracts information required for the determination process of QoS from the read data, and obtains the determination result of QoS.

Also in the packet retrieval section 340 at the transmission side, similarly to the reception side, this embodiment can be applied. The packet in which the output line number and QoS are determined in the reception side packet retrieval section 320 is switched by the packet relay processing unit 330 based on the output line number, and is inputted to the packet transmission circuit 360. In the packet transmission circuit 360, the inputted packet is temporarily stored in the buffer, and the inner header including the output line number and the packet header 260 or 270 are transmitted to the packet retrieval section 340. In the packet retrieval section 340, similarly to the foregoing embodiment, this embodiment is applied, and the following effects can be obtained.

According to the first embodiment as described above, when the priority control is performed in accordance with the priority of dscp in the interior node 112 of Diffserv, there are prepared the flow retrieval table constituted by the CAM 400 as the first retrieval unit in which although the power consumption is high, the bit length, the number of items and the like of the header information as the retrieval key are large, and the dscp-QOS conversion table 903 constituted by the FF or RGF as the second retrieval unit in which although the power consumption is low, the bit length, the number of items and the like of the header information as the retrieval key are small, and the optimum retrieval unit can be selected in view of the power saving and the retrieval key as the need arises. The number of flows which can be set as the retrieval object can be increased. The selection of the retrieval unit can be previously performed as the apparatus setting from the management terminal based on the determination of the manager of the packet transfer apparatus.

2. Second Embodiment

Next, a second embodiment will be described. In the second embodiment, since a block having the same reference numeral as the first embodiment has basically the same structure and operation, a characteristic structure of this embodiment will be mainly described, and a description of a similar point to the first embodiment will be omitted except for a necessary case. A block diagram of a packet transfer apparatus 300 of the second embodiment is as shown in FIG. 3, and is similar to the first embodiment.

Figure 12:
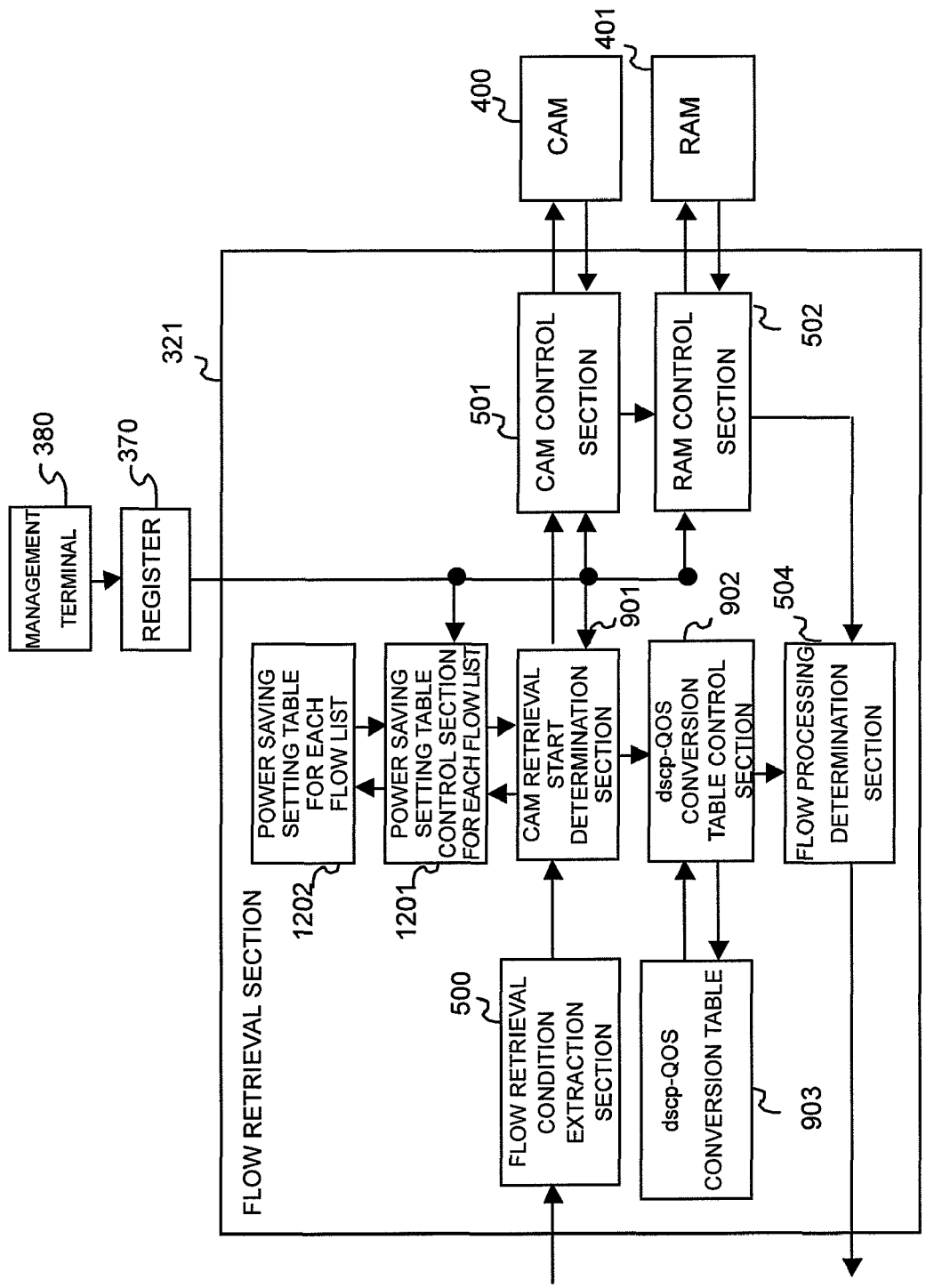
FIG. 12 is a block diagram of a flow retrieval section of a second embodiment.

FIG. 12 is a block diagram of a flow retrieval unit 321 in the second embodiment.

The flow retrieval section 321 of the second embodiment includes a power saving setting table control section 1201 for each flow list, and a power saving setting table 1202 for each flow list in addition to the flow retrieval section 321 of the first embodiment shown in FIG. 9.

The flow list is a list constituted of a set of flow entries in which for example, a VLAN (Virtual Local Area Network) is common as an input line or an output line or a logical input interface, or for example, an output VLAN is common as a logical output interface. For example, in the case of the flow detection table of FIG. 6, since the input line number 10 is common to the flow entries 604 to 606, they can be regarded as one flow list. The flow definition is set for each user using the network, and the user using the network uses the common input line, output line, input VLAN or output VLAN. Accordingly, it is desirable that the management of flow definition including power saving setting is performed for each flow list, and in order to realize this, the power saving setting table 1202 for each flow list is provided.

The table setting to the power saving setting table 1202 for each flow list is performed from, for example, the management terminal 380. The setting information from the management table 380 is temporarily stored in the register 370. In accordance with the information read from the register 370, the power saving setting table control section 1201 for each flow list, which controls the power saving setting table 1202 for each flow list, performs the management of the power saving setting table 1202 for each flow list and various settings.

Figure 11B:

FIG. 11B shows a structure of the power saving setting table 1202 for each flow list and a setting example from a user interface.

FIG. 11B shows the setting example in which the CAM retrieval is not started at the time of retrieval of QoS for the input packet from the input line (input_port) 1, 2, 4, 1000 or the like, and a retrieval unit having lower power consumption is selected (power saving setting is on), while the CAM retrieval is started at the time of retrieval of QoS for the input packet from an input line 3, 5 or the like (power saving setting is off). FIG. 11A shows an example of an instruction input from the user interface. FIG. 11B shows a structural example of the power saving setting table 1202 for each flow list, which is an example set in accordance with the instruction of FIG. 11A.

In the CAM retrieval start determination section 901, the input number of the inner header transmitted from the flow retrieval condition extraction section 500 is transmitted to the power saving setting table control section 1201 for each flow list. Incidentally, when the flow list is constructed for each output line, a process is performed in which the input line number is replaced by the output line number in the following description. Similarly, when the flow list is constructed for each input VLAN or output VLAN, a process is performed in which the input line number is replaced by the input VLAN or the output VLAN in the following description.

In the power saving setting table control section 1201 for each flow list, from the input line number transmitted from the CAM retrieval start determination section 901, the address used when reference is made to the power saving setting table 1202 for each flow list is calculated correspondingly to this, and a read request is made to the power saving setting table 1202 for each flow list while the calculated address is made the read address. The power saving setting table 1202 for each flow list transmits, as read data, the data (power saving setting information) set in the entry at the read address to the power saving setting table control section 1201 for each flow list.

The power saving setting table control section 1201 for each flow list transmits the read data transmitted from the power saving setting table 1202 for each flow list to the CAM retrieval start determination section 901. The CAM retrieval start determination section 901 determines the necessity of the CAM retrieval start from the read data. The CAM retrieval start determination section 901 determines the necessity of CAM retrieval start from the read data. The CAM retrieval start determination section 901 determines that the CAM retrieval start is made when, for example, the power saving setting information is off, and determines that the CAM retrieval start is not made when the power saving setting information is on.

When the CAM retrieval is started, the input line of the inner header transmitted from the flow retrieval condition extraction section 500, and the source MAC address, destination MAC address, source IP address, destination IP address, TOS or TC, transmission source port number, and destination port number of the packet header 260 or 270 are transmitted to the CAM control section 501, and similarly to the first embodiment, the CAM retrieval is started, and QoS is determined.

When the CAM retrieval is not started, the CAM retrieval start determination section 901 further extracts dscp in the packet header 260 or 270 transmitted from the flow retrieval condition extraction section 500, transmits it to the dscp-QOS conversion table control section 902, and determines QoS from the dscp similarly to the first embodiment.

According to the second embodiment as described above, based on the determination of the manager of the packet transfer apparatus, for each input line or output line of a packet, or for example, each input VLAN as the logical input interface, or for example, each output VLAN as the logical output interface, the CAM retrieval or the dscp-QOS conversion table 903 is selected from the plural retrieval units included in the flow retrieval section, and QoS can be determined.

For the user to which QoS determination must be performed finely based on the detailed flow definition, the CAM retrieval is executed, and for the user to which QoS determination may be simply performed based on only dscp, the QoS determination is performed based on the dscp-QOS conversion table 903. By this, when the QoS determination may be performed simply based on only the dscp, the power consumption resulting from the CAM retrieval start can be suppressed.

3. Third Embodiment

A third embodiment will be described. In the third embodiment, since a block having the same reference numeral as the first embodiment has basically the same structure and operation, a characteristic structure of this embodiment will be mainly described, and a description of a similar point to the first embodiment will be omitted except for a necessary case. A block diagram of a packet transfer apparatus 300 of the third embodiment is as shown in FIG. 3, and is similar to the first embodiment.

Figure 13:
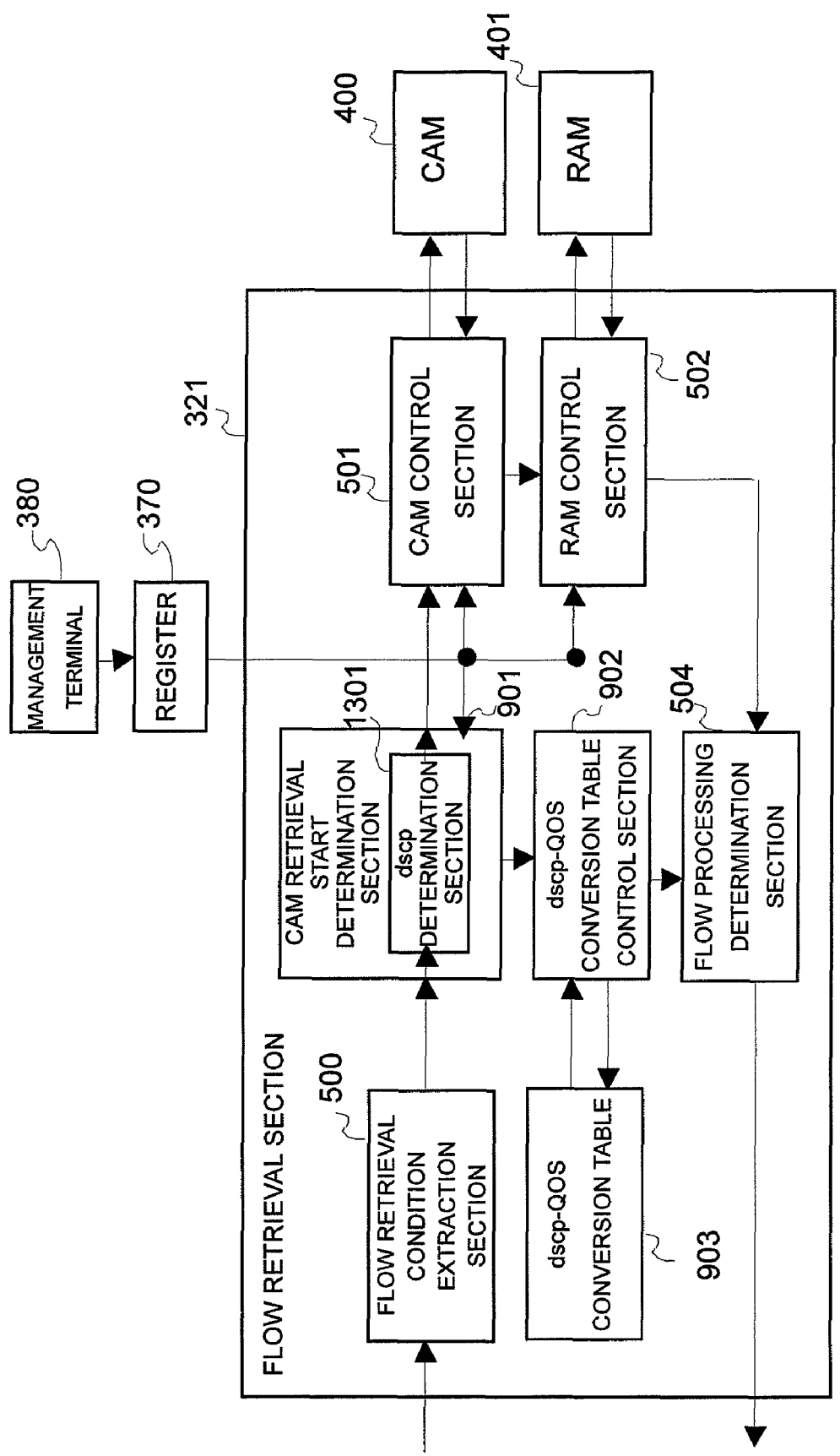
FIG. 13 is a block diagram of a flow retrieval section of a third embodiment.

FIG. 13 is a block diagram of a flow retrieval section 321 of the third embodiment.

The flow retrieval section 321 of the third embodiment includes a dscp determination section 1301 in the CAM retrieval start determination section 901 of the flow retrieval section 321 of the first embodiment shown in FIG. 9.

In Diffserv, a relation between a value of marked dscp and QoS is defined as PHB (Per Hop Behavior) in RFC2597 (Assured Forwarding PHB Group) and RFC2598 (An Expedited Forwarding PHB). In these RFCs, QoS is defined with respect to the marked dscp having a value other than 0. On the other hand, in the state where marking is not performed, dscp is 0 and is treated as the best effort of minimum priority.

In the dscp determination section 1301, the value of dscp of the packet header 260 or 270 transmitted from the flow retrieval condition extraction section 500 is determined. When the value of dscp is not 0, it is determined that marking is already performed, and the CAM retrieval is not started. The CAM retrieval start determination section 901 transmits the dscp to the dscp-QOS conversion table 902, and determines QoS from the dscp similarly to the above. On the other hand, when the dscp is 0, since there is a possibility that marking is not executed, the CAM retrieval is started in which the inner header and the packet header are outputted to the CAM control section 501, and QoS is determined.

According to the third embodiment as stated above, with respect to the packet in which the dscp is not subjected to the marking, the CAM retrieval is started, and QoS is determined finely based on the detailed flow. With respect to the packet in which the dscp is already subjected to the marking, the CAM retrieval is not started, and QoS is simply determined based on only the dscp, so that the power consumption resulting from the CAM retrieval start can be suppressed.

4. Fourth Embodiment

A fourth embodiment will be described. In the fourth embodiment, since a block having the same reference numeral as the first embodiment has basically the same structure and operation, a description thereof will be omitted except for a necessary case.

Figure 14:
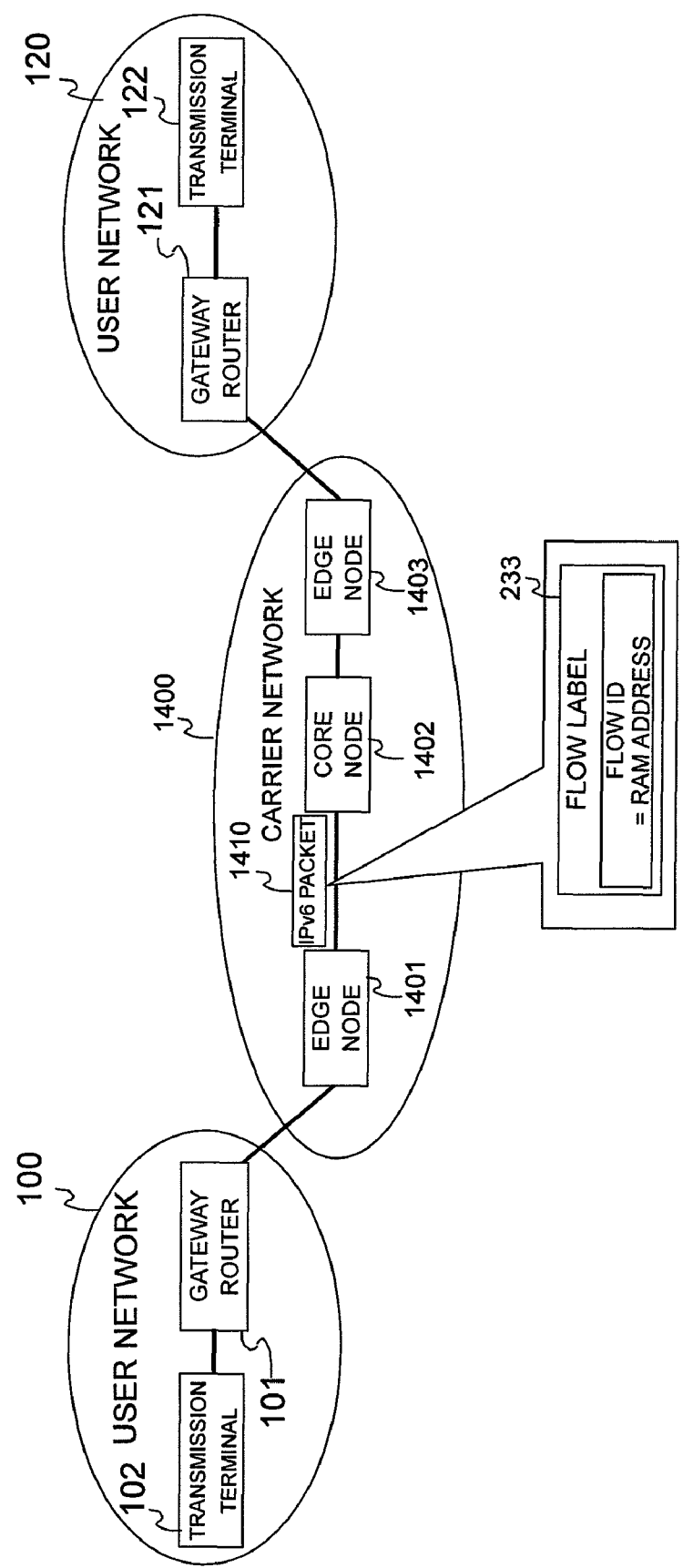
FIG. 14 is a network structural view of a fourth embodiment.

FIG. 14 is a network structural view to which the packet transfer apparatus of the fourth embodiment is applied.

Although a user network 100 and a user network 120 have the same structure as those of FIG. 1, it is assumed that communication is performed using IPv6. A flow label 233 of an IPv6 header 230 is not specifically defined, and a future plan of the definition is not yet decided. Accordingly, the flow label 233 is generally not used. According to RFC3697 (IPv6 Flow Label Specification), in a transmission terminal 102 to perform IPv6 communication, only when the transmission packet is treated as a specific flow, the flow label 233 is set to a value other than 0, and when communication is performed without using the flow label 233, 0 is set as the flow label 233. Accordingly, when the transmission terminal 102 communicates without using the flow label 233, the flow label 233 is 0.

A packet outputted by a transmission terminal 102 of the user network 100 to a carrier network 1400 through a gateway router 101 is inputted to an edge node 1401 arranged at the boundary of an inlet of the carrier network 1400.

In the carrier network 1401, it is assumed that the flow is systematically treated from the edge node 1401 to the edge node 1403 through the core node 1402. When the packet is inputted to the edge node 1401, flow retrieval is performed in the edge node 1401, and the flow to which the input packet fits is identified.

When the flow label 233 of the input packet to the edge node 1401 is 0, the flow label 233 is written by the code indicating the flow identified as the result of flow retrieval. Since the flow label has 20 bits, approximately one million flows can be identified by the flow label. Besides, a flow label rewriting flag indicating that the flow label is rewritten is set in the least significant bit as a non-used field of TC. Incidentally, the setting field of the flow label rewriting flag may be a suitable field, not the non-used field of TC, as long as the field is not used.

When the flow label 233 of the input packet to the edge node 1401 is not 0, since the flow label is used, rewriting of the flow label is not performed, and the flow label rewriting flag is not set.

After rewriting of the flow label 233 is performed in the edge node 1401, the packet is inputted to the core node 1402, and flow retrieval based on the flow label 233 is executed. Thereafter, the packet is inputted to the edge node 1403, and when the flow label rewriting flag is set, the flow label value is rewritten to 0, and is inputted to the gateway router 121 of the user network 120. When the flow label rewriting flag is not set, the flow label 233 is not rewritten to 0, but is directly inputted to the gateway router 121 of the user network 120.

The packet transfer apparatus of the fourth embodiment is applied as, for example, the core node 1402. The block diagram of the packet transfer apparatus 300 of the fourth embodiment is as shown in FIG. 3, and is similar to the first embodiment.

Figure 15:
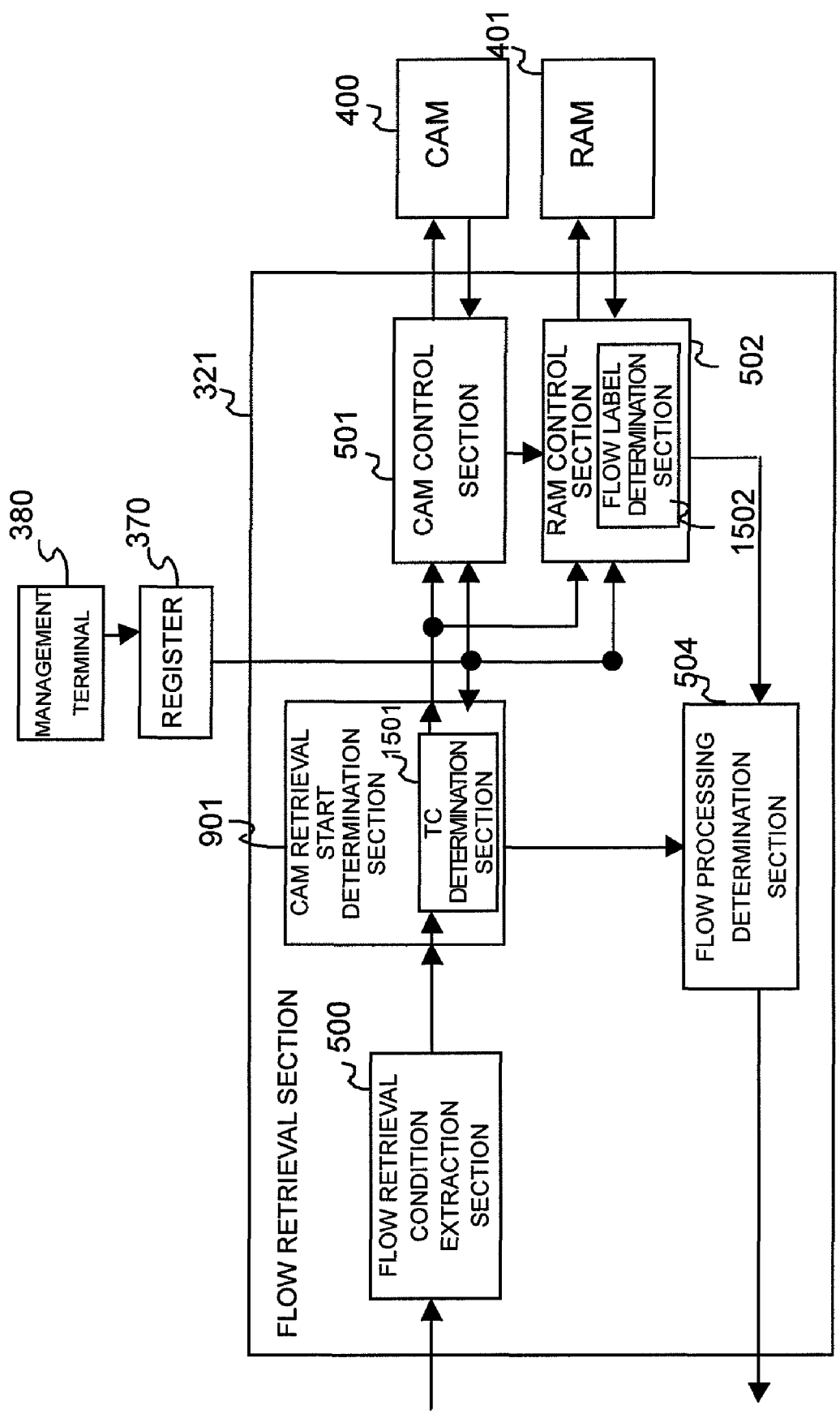
FIG. 15 is a block diagram of a flow retrieval section of the fourth embodiment of the invention.

FIG. 15 is a block diagram of the flow retrieval section 321 to which the invention is applied in the fourth embodiment.

The flow retrieval section 321 of the fourth embodiment includes, in addition to the flow retrieval section 321 of the first embodiment shown in FIG. 9, a TC determination section (flag determination section) 1501 in a CAM start determination section 901, and includes a flow label determination section 1502 in a RAM control section 502.

In the TC determination section 1501, reference is made to the least significant bit of TC as a flow label rewriting flag of the packet header 260 or 270 transmitted from the flow retrieval condition extraction section 500.

When the flow label rewriting flag is set, the flow label 233 is transmitted to the RAM control section 502 without starting the CAM retrieval. From the flow label 233 transmitted from the CAM retrieval start determination section 901, correspondingly to this, the RAM control section 502 calculates the address used when reference is made to the RAM 401, and makes a read request to the RAM 401 while the calculated address is made the read address. Hereinafter, similarly to the case explained in the first embodiment, QoS is determined.

On the other hand, when the flow label rewriting flag is not set, the CAM retrieval is started, and QoS is determined.

According to the fourth embodiment of the invention as described above, when the transmission terminal 102 makes communication without using the flow label 233, the code indicating the flow is given to the flow label 233 in the edge node 1401, so that the read address for referring to the RAM is directly obtained from the flow label 233 without starting the CAM retrieval, and QoS can be determined. Accordingly, the power consumption resulting from the CAM retrieval start can be suppressed.

Besides, in the CAM retrieval by a long retrieval key as in IPv6, there is a problem that the retrieval performance of the CAM is lowered (see "Review of IPv6-compliant High Speed Flow Identification System" (Ishikawa, September 2002, The Institute of Electronics, Information and Communication Engineers, Society Conference)). According to the fourth embodiment, in the core node 1402 in which the flow is collected and especially high speed retrieval performance is required, QoS can be determined without starting the CAM retrieval, there is also an effect of preventing the reduction of the flow retrieval performance of IPv6 in the core node 1402.

5. Fifth Embodiment

A fifth embodiment will be described. In the fifth embodiment, since a block having the same reference numeral as the first embodiment has basically the same structure and operation, a description thereof will be omitted except for a necessary case.

A block diagram of a packet transfer apparatus 300 of the fifth embodiment is as shown in FIG. 3 and is similar to the first embodiment.

Figure 16:
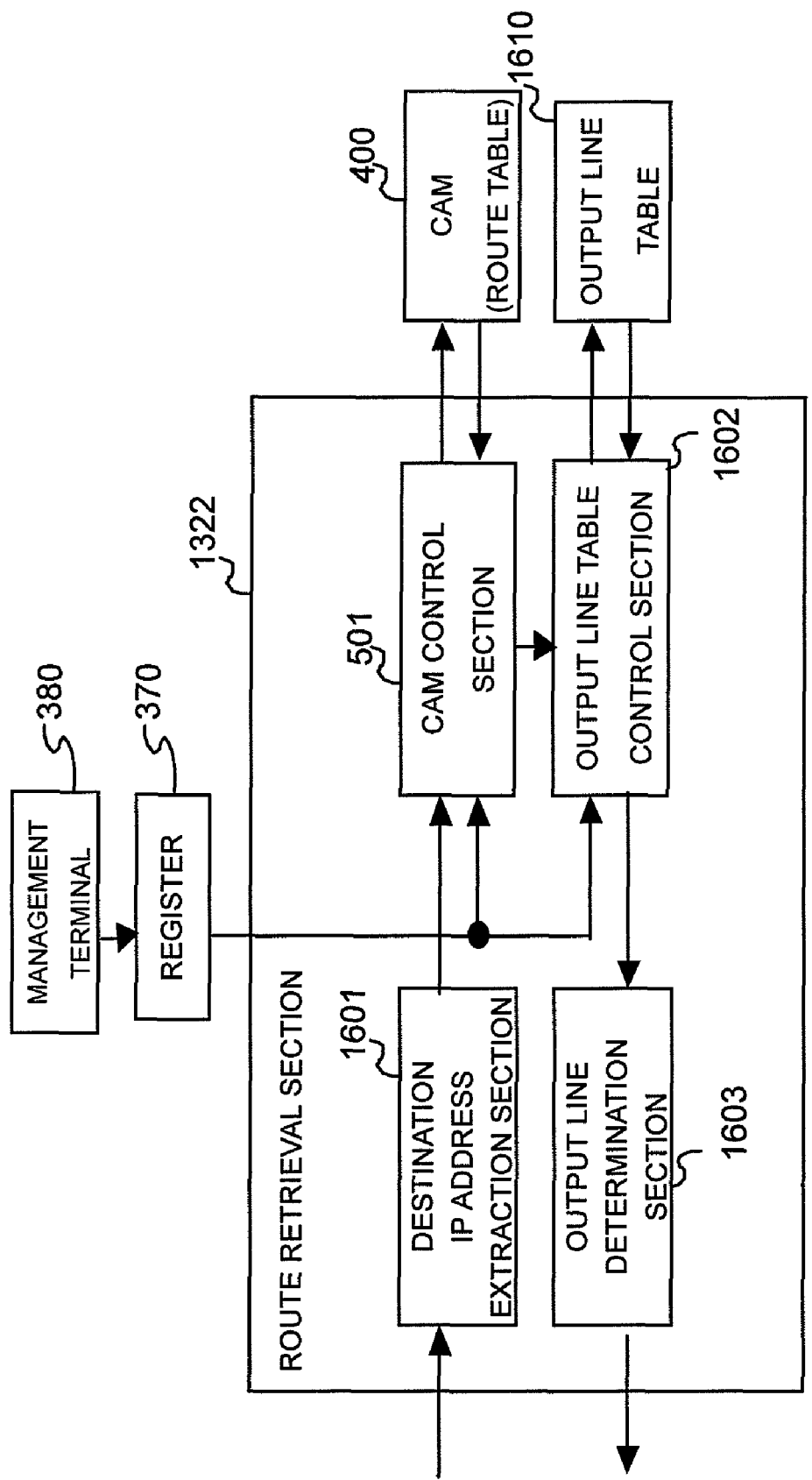
FIG. 16 is a block diagram of a route retrieval section using a CAM in the related art.

FIG. 16 shows an example of a structure of a route retrieval section 1322 using a CAM in the related art. Incidentally, the structure shown in FIG. 16 and the following description are for facilitating the understanding of this embodiment, and do not necessarily constitute the related art.

A destination IP address extraction section 1601 of the route retrieval section 1322 receives a packet header 260 or 270 from a packet reception circuit 310, extracts a destination IP address 225 or 236 required for route retrieval and an ID version value 221 or 231, and transmits them to a CAM control section 501.

The CAM control section 501 makes a retrieval key of an IP version value to identify IPv4/IPv6 transmitted from the destination IP address extraction section 1601 and the destination IP address 225 or 236, and transmits a retrieval request signal to the CAM 400 constituting a route table and the retrieval key to the CAM 400. The CAM 400 retrieves the route table by the retrieval key transmitted from the CAM control section 501, and returns, as a hit address, an address of a route entry consistent with the retrieval key to the CAM control section 501. The CAM control section 501 transmits the hit address transmitted from the CAM 400 to the output line table control section 1602. From the hit address transmitted from the CAM control section 501, correspondingly to this, the output line table control section 1602 calculates an address used when reference is made to an output line table 1610, and makes a read request to the output line table 1610 while the calculated address is made a read address.

Figure 17:
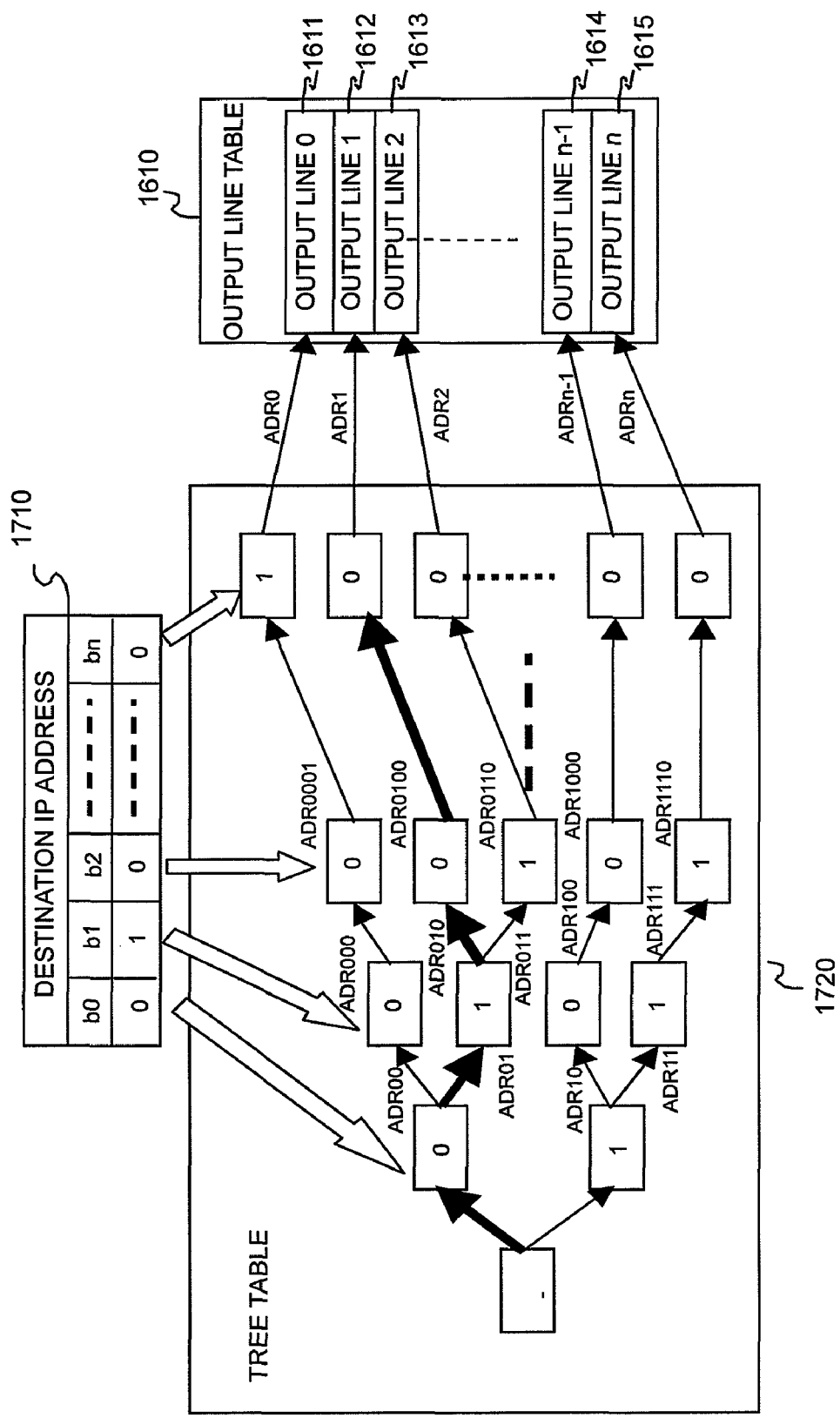
FIG. 17 is a flow diagram of a retrieval process of tree retrieval.

FIG. 17 is a structural view of the output line table 1610.

The output line table 1610 includes output line entries 1611 to 1615 in which output line information (for example, output line number) to a packet consistent with each route entry is set correspondingly to the route entry. The output line table 1610 transmits, as read data, data set in the entry of the read address to the output line table control section 1602.

The output line table control section 1602 transmits the read data transmitted from the output line table 1610 to the output line determination section 1603. The output line determination section 1603 extracts information necessary for determination processing of the output line from the read data, and obtains the determination result of the output line. The output line determination section 1603 transmits the determination result of the output line to the packet reception circuit 310.

Incidentally, in order to enable the table setting to the CAM 400 or the output line table 1610, the route retrieval section 1322 is connected with a management terminal 380, and setting information from the management terminal 380 is temporarily stored in a register 370. In accordance with the information read from the register 370, the CAM control section 501 to control the CAM 400 performs management of the CAM 400 and various settings. Besides, the output line table control section 1602 to control the output line table 1610 performs the management of the output line table 1610 and various settings.

Next, the concept of tree retrieval typical as the route retrieval in the case where the CAM is not used will be described with reference to FIG. 17. In the case of the tree retrieval, in sequence from a higher-order bit of a destination IP address 1710, in accordance with the value "0" or "1" of the bit, the branch of a tree table 1720 is traced. Incidentally, as the tree table, in general, a memory device having large capacity, such as an SDRAM (Synchronous Dynamic Random Access Memory) is applied. In the example of FIG. 17, in accordance with the value of 010 ● ● ● 0 of the destination IP address 1710, the branch of the tree table 1720 is traced along the thick line.

In the example of FIG. 17, the first bit b0 of the destination IP address is 0, and when the entry of the tree table 1720 corresponding to this value is read, as the read address used when the tree table 1720 is next read according to the value of next bit b1, ADR00 for b1=0 and ADR01 for b1=1 are written there. Since bit b1 of the destination IP address 1710 is b1=1, next, the tree table 1720 is read by using the read address ADR01. Then, when the branch is traced to the final stage of the branch according to the value of next bit b2, as the read address used when the tree table 1720 is next read, ADR010 for b2=0 and ADR011 for b1=1 are written. Since the bit b2 of the destination IP address 1710 is b2=0, the tree table 1720 is next read by using the read address ADR010. Then, subsequently, as long as a branch exists, the same process is repeated. In the example of FIG. 17, since there exists a branch to the final bit bn of the destination IP address 1710, the tree table 1720 is read by using the read address ADR0100 correspondingly to bn=0. Here, the branch is ended, and the output line can be determined.

When the entry of the read address ADR0100 is read from the tree table 1720, the address ADR1 of the output line entry 1612 of the output line table 1610 is written therein. Next, when the output line table 1610 is read by using the read address ADR1, the output line 1 corresponding to the destination IP address 1710 is written, and the output line to the packet having the destination IP address 1710 can be determined.

As stated above, in the tree retrieval, since it is necessary to read the tree table by the number of branches of the tree, as the number of bits to be checked in the destination IP address becomes large, the retrieval performance is lowered. Accordingly, the retrieval system is more suitable for IPv4 having shorter IP address of 32 bits than IPv6 having IP address of 128 bits.

Figure 18:
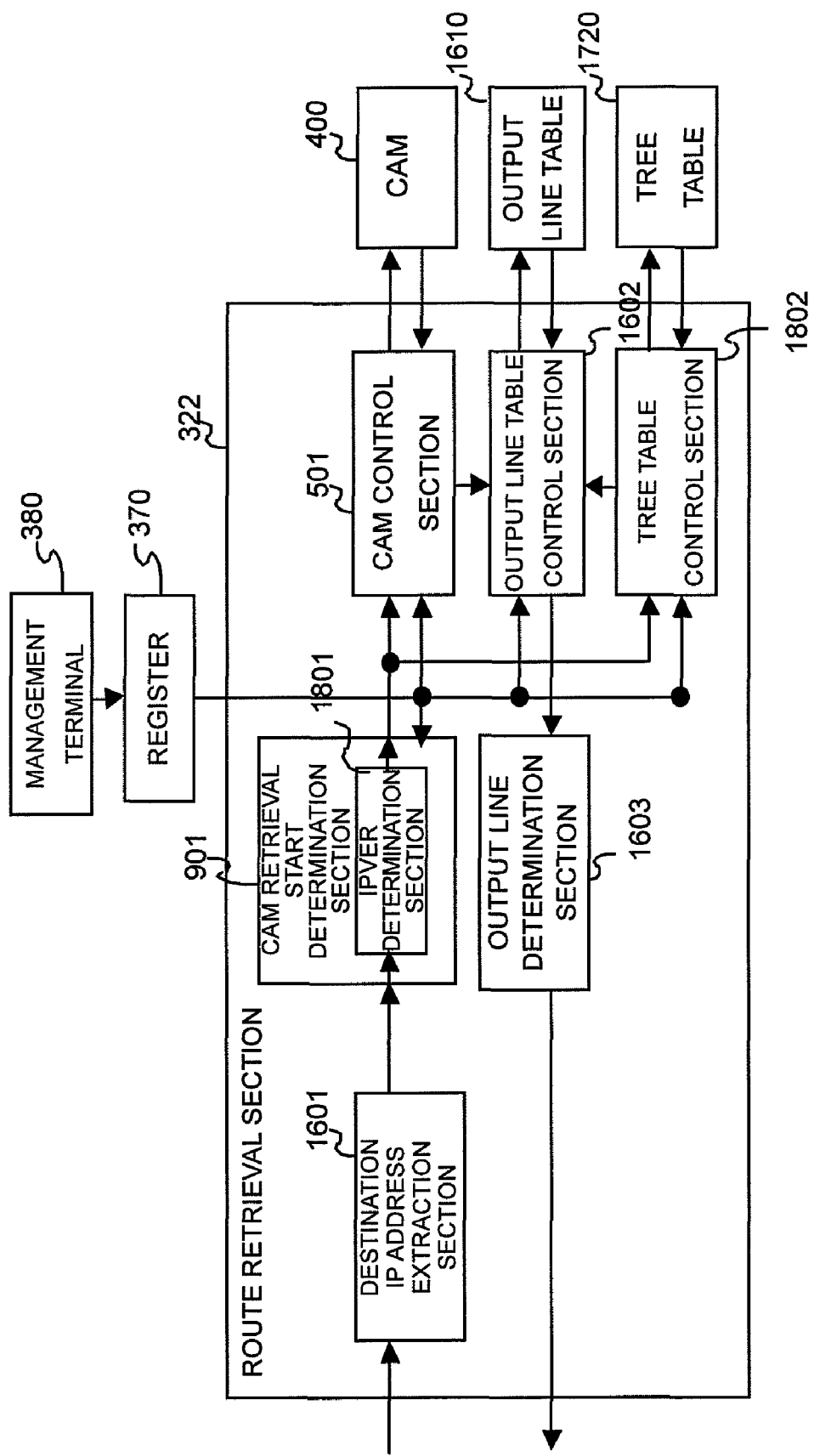
FIG. 18 is a block diagram of a route retrieval section of a fifth embodiment of the invention.
Figure 19:
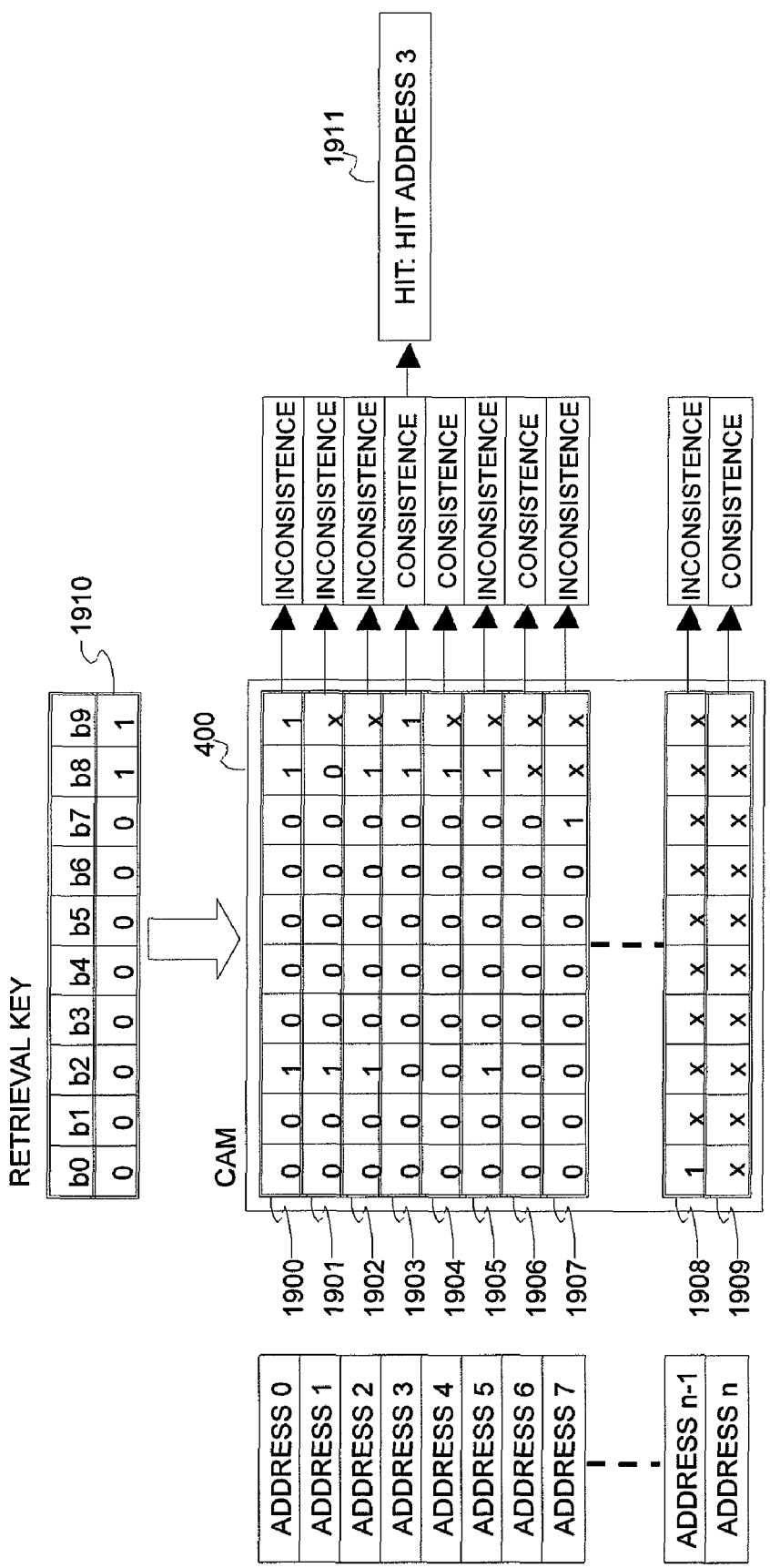
FIG. 19 is a flow diagram of a retrieval process of a CAM.

FIG. 18 is a structural view of a route retrieval section 322 of this embodiment. A characteristic structure of this embodiment will be mainly described, and the same structure as the foregoing route retrieval section 1322 is denoted by the same reference numeral and its description will be omitted.

The route retrieval section 322 of the fifth embodiment includes, in addition to the route retrieval section 1322 using the CAM shown in FIG. 16, a CAM retrieval start determination section 901 having an IPVER determination section 1801, a tree table control section 1802, and a tree table 1720. As described above, since IPv6 has a long IP address and is not suitable for the tree retrieval, retrieval is performed using the CAM 400 so that the speed of the retrieval performance is increased. For IPv4, the tree retrieval using the SDRAM having lower power consumption than the CAM 400 is used, so that the power consumption is reduced.

Incidentally, in order to enable the table setting to the CAM 400, the output line table 1610 and the tree table 1720, the management terminal 380 is connected to the route retrieval section 322, and the setting information from the management terminal 380 is temporarily stored in the register 370. In accordance with the information read from the register 370, the CAM control section 501 to control the CAM 400 performs management of the CAM 400 and various settings. Besides, the output line table control section 1602 to control the output line table 1610 performs management of the output line table 1610 and various settings. Besides, the tree table control section 1802 to control the tree table 1720 performs management of the tree table 1720 and various settings.

In the CAM retrieval start determination section 901, the IP version value 221 or 231 transmitted from the destination IP address extraction section 500 is determined by the IPVER determination section 1801.

When the IP version determined by the IPVER determination section 1801 is IPv4, it is determined that the CAM retrieval is not started, the destination IP address 225 transmitted from the destination IP address extraction section 500 is made the retrieval key, and is transmitted to the tree table control section 1802. The tree table control section 1802 retrieves the tree table 1720 in accordance with the destination IP address 225 transmitted from the CAM retrieval start determination section 901, and the read address used when reference is made to the output line table 1610 corresponding to the destination IP address 225 is transmitted to the output line table control section 1602.

On the other hand, when the IP version determined by the IPVER determination section 1801 is IPv6, it is determined that the CAM retrieval is started, the destination IP address 236 transmitted from the destination IP address extraction section 500 is made the retrieval key, and is transmitted to the CAM control section 501. The CAM control section 501 makes the retrieval key of the destination IP address 236 transmitted from the CAM retrieval start determination section 901, and transmits a retrieval request signal to the CAM 400 constituting the route table and the retrieval key to the CAM 400. The CAM 400 retrieves the route table by using the retrieval key transmitted from the CAM control section 501, the address of the route entry consistent with the retrieval key is made a hit address and is returned to the CAM control section 501. The CAM control section 501 transmits the hit address transmitted from the CAM 400 to the output line table control section 1602. From the hit address transmitted from the CAM control section 501 and correspondingly to this, the output line table control section 1602 calculates the read address used when reference is made to the output line table 1610.

By the above process, in both the cases of IPv4 and IPv6, the output line table control section 1602 can obtain the read address used when reference is made to the output line table 1610. The output line table control section 1602 makes the read request to the output line table 1610 by this read address. The output line table 1610 transmits, as read data, data (output line number) set in the entry at the read address to the output line table control section 1602. The output line table control section 1602 transmits the read data transmitted from the output line table 1610 to the output line determination section 1603. The output line determination section 1603 extracts information required for the determination process of the output line from the read data, and obtains the determination result of the output line. The output line determination section 1603 transmits the determination result of the output line to the packet reception circuit 310.

According to the fifth embodiment as described above, since IPv6 has a long IP address and is not suitable for the tree retrieval, retrieval is performed by the CAM so that the speed of the retrieval performance can be increased. Simultaneously, for IPv4, the tree retrieval using the SDRAM having lower power consumption than the CAM is used, so that the power consumption can be reduced.

Incidentally, in addition to the determination of the CAM retrieval start by the IP version, as in the first embodiment, the CAM retrieval start may be determined in accordance with the setting information previously set by the management terminal 380. Besides, as in the second embodiment, whether the CAM start is performed or not may be set for each flow list of the input line or the like.

Although various embodiments are described, no limitation is made to these embodiments, and various structures can be adopted within the scope not departing from the gist.

The invention can be used as a packet transfer apparatus constituting a network.

What is claimed is:

1. A packet transfer apparatus which can be connected to a plurality of input lines and a plurality of output lines, and transfers a packet received from each of the input lines to one of the output lines specified by header information, comprising:
   a reception circuit to receive the packet through the input line;
   a flow retrieval section to obtain a priority based on the header information of the received packet;
   a relay section to transfer the packet; and
   an output circuit to output the packet transferred from the relay section through the output line,
   wherein the flow retrieval section includes:
   a determination section to execute, in accordance with previously set setting information or a previously determined header information item of the header information of the packet, a first process of outputting a plurality of header information items for identifying a flow or a second process of outputting a header information item indicating a priority extracted from the header information of the received packet;
   a first retrieval unit that inputs the plurality of header information items from the determination section, identifies the flow of the packet by using the plurality of header information items as a retrieval key, and obtains a priority previously specified for each flow; and
   a second retrieval unit that includes a conversion table in which priorities are previously stored correspondingly to header information items indicating priorities, inputs the header information item indicating the priority from the determination section, refers to the conversion table to obtain the priority by using the header information item indicating the priority as a retrieval key, and power consumption of the second retrieval unit is lower than power consumption of the first retrieval unit, and
   the packet transfer apparatus transfers and controls the packet in accordance with the obtained priority.

2. The packet transfer apparatus according to claim 1, wherein the header information item indicating the priority is a DiffServe Code Point (dscp) value.

3. The packet transfer apparatus according to claim 1, wherein the first retrieval unit includes:
   a flow retrieval table that stores a plurality of entries each including a plurality of header information items previously determined from the header information, and outputs an address of an entry consistent with the retrieval key; and a priority table that stores priorities corresponding to read addresses, and outputs the priority based on the read address corresponding to the address outputted from the flow retrieval table.

4. The packet transfer apparatus according to claim 3, wherein the flow retrieval table includes a Content Addressable Memory (CAM).

5. The packet transfer apparatus according to claim 1, further comprising
a setting interface to set the setting information to indicate whether the determination section executes the first process or the second process,
wherein the determination section executes one of the first process and the second process in accordance with the setting information.

6. The packet transfer apparatus according to claim 1, further comprising
a setting table that stores which of the first process and the second process is executed for each flow list,
wherein the determination section executes one of the first process and the second process for each flow list of the received packet with reference to the setting table.

7. The packet transfer apparatus according to claim 6, wherein the flow list is one of an input line, an output line, an input virtual network, an output virtual network and a logical interface.

8. The packet transfer apparatus according to claim 1, wherein the previously determined header information item includes a value of the header information item indicating the priority.

9. The packet transfer apparatus according to claim 8, wherein the previously determined header information item is at least one of a value of all of or part of Type of Service (TOS) of IPv4 and Traffic Class (TC) of IPv6, and a value of the experimental bits (EXP) of Multiprotocol Label Switching (MPLS), and a value of Class of Service (COS) of IEEE802.1p.

10. The packet transfer apparatus according to claim 8, wherein
the previously determined header information item is a dscp value, and
when the dscp value is 0, the priority is obtained by the first retrieval unit, and when the dscp value is a value other than 0, the priority is obtained by the second retrieval unit.

11. A packet transfer apparatus which can be connected to a plurality of input lines and a plurality of output lines, and transfers a packet received from each of the input lines to one of the output lines specified by header information, comprising:
a reception circuit to receive the packet through the input line;
a flow retrieval section to obtain a priority based on the header information of the received packet;
a relay section to transfer the packet; and
an output circuit to output the packet transferred from the relay section through the output line,
wherein the flow retrieval section includes:
a determination section to execute a first process of outputting a plurality of header information items which are extracted from the header information of the received packet and are for identifying a flow or a second process of outputting a header information item extracted from the header information of the received packet and indicating a flow in accordance with whether the header information item indicating the flow is set in the header information of the packet;
a first retrieval unit that inputs the plurality of header information items from the determination section, identifies the flow of the packet by using the plurality of header information items as a retrieval key, and obtains a priority previously specified for each flow; and
a second retrieval unit that inputs the header information item indicating the flow from the determination section, refers to a conversion table, in which priorities are previously stored, correspondingly to the header information items indicating the flow, and obtains the priority, and power consumption of the second retrieval unit is lower than power consumption of the first retrieval unit, and
the packet transfer apparatus transfers and controls the packet in accordance with the obtained priority.

12. The packet transfer apparatus according to claim 11, wherein the header information item indicating the flow includes at least an IPv6 flow label.

13. The packet transfer apparatus according to claim 11, wherein
the first retrieval unit includes a flow retrieval table for identifying a flow based on the plurality of header information items, and
the flow retrieval table includes a Content Addressable Memory (CAM).

14. A packet transfer apparatus which can be connected to a plurality of input lines and a plurality of output lines, and transfers a packet received from each of the input lines to one of the output lines specified by header information, comprising:
a reception circuit to receive the packet through the input line;
a route retrieval section to obtain output line information based on a destination address of the received packet;
a relay section to transfer packet in accordance with the output line information; and
an output circuit to output the packet transferred from the relay section through the output line,
wherein the route retrieval section includes:
a first retrieval unit that obtains, based on the destination address of the packet, the corresponding output line information;
a second retrieval unit that obtains, based on the destination address of the packet, the corresponding output line information and power consumption of the second retrieval unit lower than power consumption of the first retrieval unit; and
a determination section to determine that output line information is obtained by which of the first retrieval unit and the second retrieval unit in accordance with a communication protocol of the received packet or previously set setting information.

15. The packet transfer apparatus according to claim 14, further comprising a setting interface to set the setting information indicating that the determination section obtains the output line information by which of the first retrieval unit and the second retrieval unit.

16. The packet transfer apparatus according to claim 14, wherein the determination section determines the communication protocol according to a value of one of at least Protocol of PPP of the received packet, Ether Type of Ethernet, and Version (VER) of IP, and selects the first or second retrieval unit in accordance with the determination result to execute a route retrieval.

17. The packet transfer apparatus according to claim 14, wherein the first retrieval unit includes a Content Addressable Memory (CAM), and the second retrieval unit includes a tree table.

18. The packet transfer apparatus according to claim 14, wherein the determination unit:

obtains the output line information by the first retrieval unit when the communication protocol is IPv6; and obtains the output line information by the second retrieval unit when the communication protocol is IPv4.

* * * * *